United States Patent
Ishida

(10) Patent No.: US 6,732,204 B2
(45) Date of Patent: May 4, 2004

(54) DATA TRANSFER CONTROL DEVICE AND ELECTRONIC EQUIPMENT

(75) Inventor: Takuya Ishida, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 442 days.

(21) Appl. No.: 09/805,029

(22) Filed: Mar. 14, 2001

(65) Prior Publication Data

US 2003/0018839 A1 Jan. 23, 2003

(30) Foreign Application Priority Data

Mar. 16, 2000 (JP) ........................................ 2000-073622

(51) Int. Cl.$^7$ ................................................ G06F 13/12
(52) U.S. Cl. ........................... 710/71; 710/65; 370/505; 370/506
(58) Field of Search ............................. 710/1, 65–71; 375/341; 370/503–506

(56) References Cited

U.S. PATENT DOCUMENTS 6,266,710 B1 * 7/2001 Dittmer et al. ................. 710/1
6,327,316 B1 * 12/2001 Ikeda .......................... 375/341
6,567,423 B1 * 5/2003 Iyer ............................ 370/505

OTHER PUBLICATIONS

USB 2.0 Transceiver Macrocell Interface (UTMI) Specification, Version 1.0rc, Apr. 25, 2000, 1999–2000 Intel Corporation.

* cited by examiner

*Primary Examiner*—Jeffrey Gaffin
*Assistant Examiner*—Mike Nguyen
(74) *Attorney, Agent, or Firm*—Oliff & Berridge, PLC

(57) ABSTRACT

The objective is to provide a data transfer control device and electronic equipment that implement bit insertion, encoding, decoding, and bit deletion at a slow clock frequency. A bit stuffing circuit and NRZI encoder are provided in a stage before a parallel-serial conversion circuit on the transmission side and an NRZI decoder and a bit unstuffing circuit are provided in a stage after a serial-parallel conversion circuit on the reception side, so that bit stuffing, NRZI encoding, NRZI decoding, and bit unstuffing are implemented on parallel data, not serial data. Any bits that have overflowed due to the bit insertion are carried forward to data for the next clock cycle and any deficiency of bits caused by bit deletion is moved up from the data of the next clock cycle. Insertion (or deletion) of bits is based on the thus calculated bit stuffing (or bit unstuffing) position and the range of parallel data to be output is based on the accumulated total of the number of bits that overflow (or contract).

16 Claims, 20 Drawing Sheets

FIG. 3A  NRZI
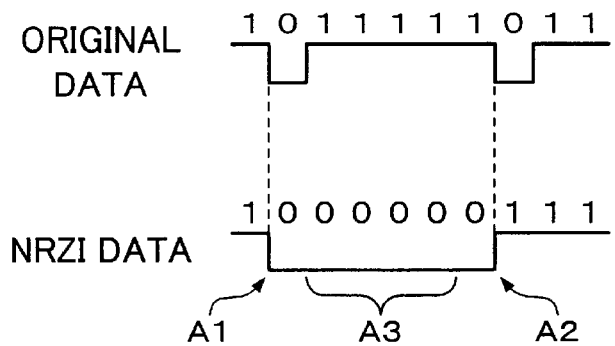
FIG. 3B  BIT STUFFING
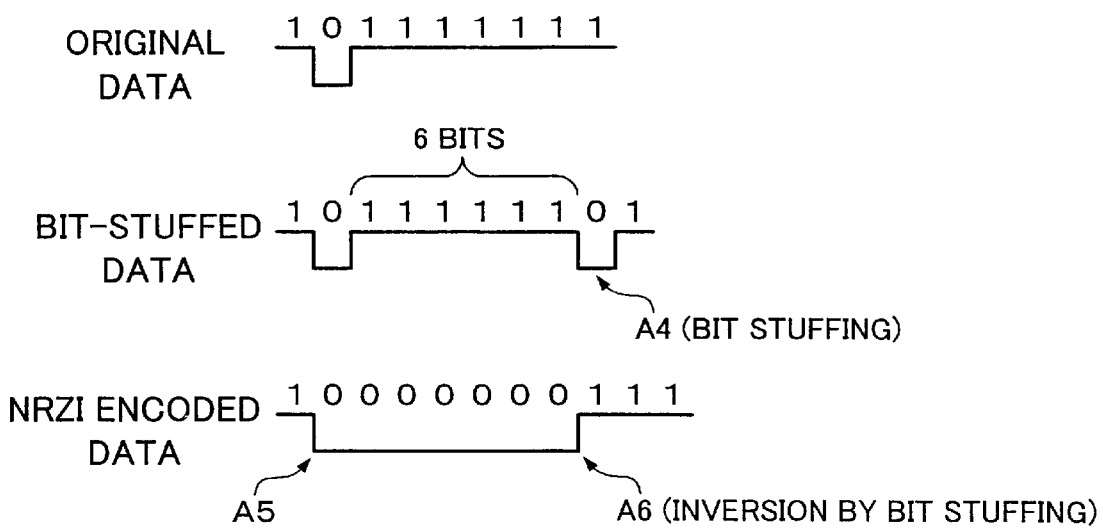

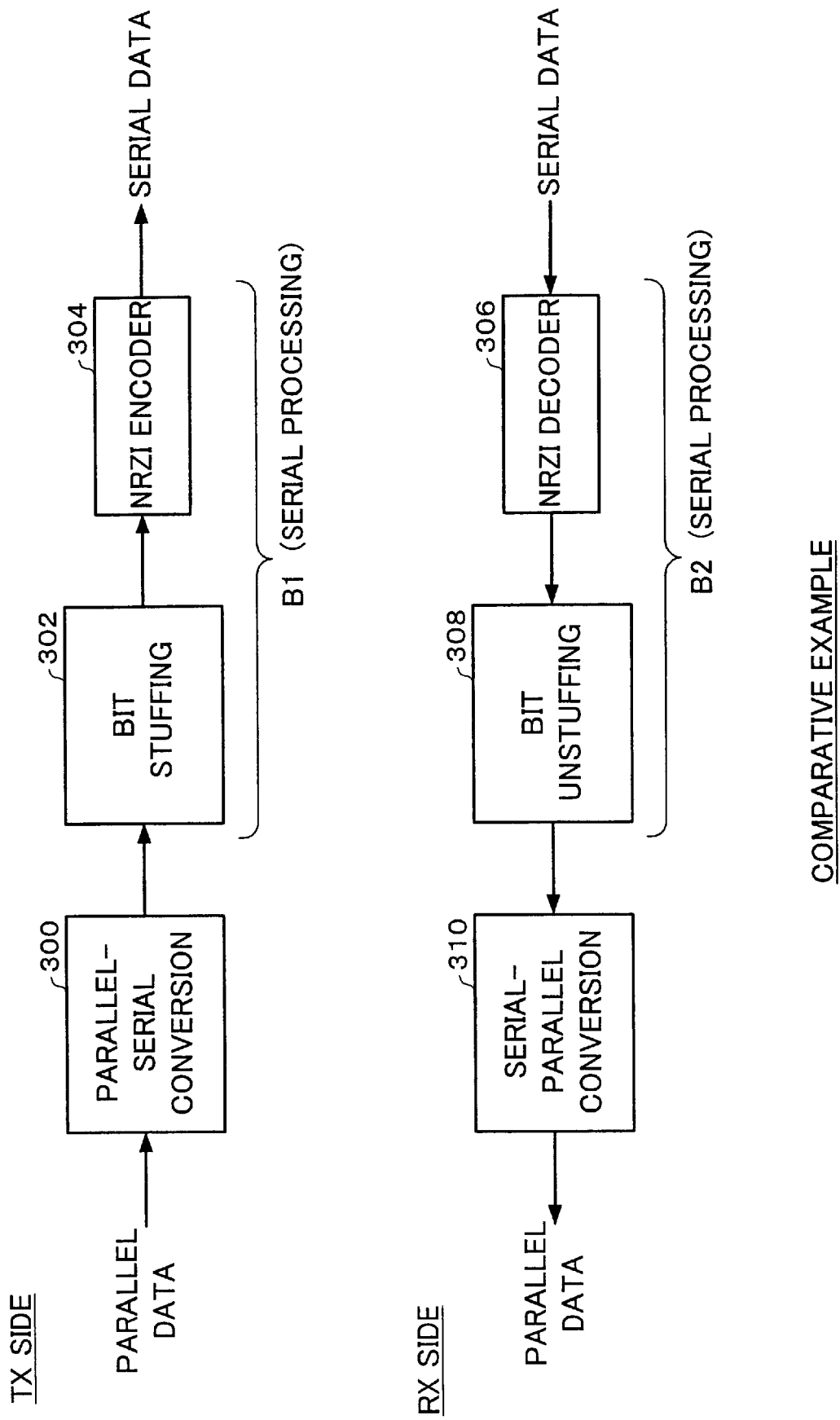

NRZI ENCODING COMPUTATION

NRZI DECODING COMPUTATION

DATA TRANSFER CONTROL DEVICE AND ELECTRONIC EQUIPMENT

FIELD OF THE INVENTION

The present invention relates to a data transfer control device and electronic equipment.

BACKGROUND ART

The universal serial bus (USB) standard has recently attracted attention as an interface standard for connections between personal computers and peripheral equipment (broadly speaking: electronic equipment).

This USB standard has the advantage of enabling the connection of up to 127 devices, such as a personal computer and peripheral equipment, via a serial bus. This also has the advantage of enabling the use of connectors of the same standard to connect peripheral equipment such as a mouse, keyboard, and printer, which are connected by separate standard connectors in the prior art, and of making it possible to implement plug-and-play and hot-plug features.

With USB, data is encoded by a method called "no return to zero inversion" (NRZI) for transfer. This NRZI method is an encoding method based on the observation that the ratio of occurrence of "0" bits in data is generally far higher than the ratio of occurrence of "1" bits, to prevent slippage in synchronization caused by an increase in the frequency of changed in signal level on the serial bus. For that reason, NRZI maintains the previous signal level if a bit in the original data is 1, but causes the signal level to invert if a bit in the original data is 0.

This means that if NRZI encoding is performed on original data in which there are consecutive "0" bits, the signal level will change at each bit in the encoded data.

However, if there is a string of "1" bits in the original data, the signal level of the data after encoding will not change for a long time, causing problems of slippage in the synchronization.

For that reason, USB is designed to subject the original data to processing called bit stuffing (broadly speaking: bit insertion). In other words, if there are six consecutive "1" bits, a "0" bit is always inserted thereafter. The data that has been subjected to this bit stuffing is then encoded by the above-described NRZI method. This ensures that. a state in which the signal level does not change does not occur for long periods of time, even if there are strings of "1" bits in the original data.

SUMMARY OF THE INVENTION

One aspect of the present invention relates to a data transfer control device for data transfer over a serial bus, the data transfer control device comprising: a bit insertion circuit which inserts a bit of a second signal level on condition that there is a given number of bits of a first signal level consecutively; and a parallel-serial conversion circuit for converting parallel data into serial data which is transferred over the serial bus, wherein the bit insertion circuit is provided in a stage before the parallel-serial conversion circuit, and wherein the bit insertion circuit receives N-bit parallel input data that has been input at a given clock cycle from a previous-stage circuit and outputs N-bit parallel output data into which a bit has been inserted.

Another aspect of the present invention relates to a data transfer control device for providing data transfer over a serial bus, the data transfer control device comprising: a serial-parallel conversion circuit for converting serial data which is transferred over the serial bus into parallel data; and a bit deletion circuit which deletes a bit of a second signal level, on condition that there is a given number of bits of a first signal level consecutively, wherein the bit deletion circuit is provided in a stage after the serial-parallel conversion circuit, and wherein the bit deletion circuit receives N-bit parallel input data that has been input at a given clock cycle through the serial-parallel conversion circuit, and outputs N-bit parallel output data from which a bit have been deleted.

BRIEF DESCRIPTION OF THE DRAWINGS

FIGS. 3A and 3B are illustrative of NRZI and bit stuffing.

FIG. 4 illustrates a comparative example.

DETAILED DESCRIPTION OF EMBODIMENTS

Figure 1:
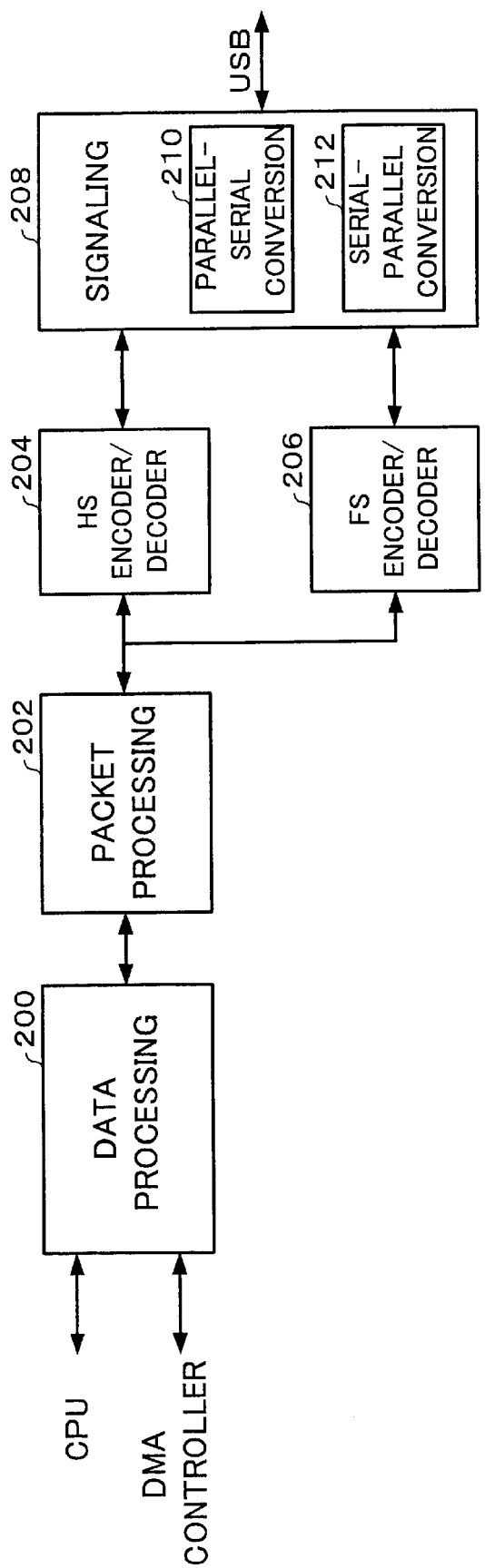
FIG. 1 shows the overall configuration of a data transfer control device in accordance with an embodiment of the present invention.

Embodiments of the present invention are described below.

Although USB has the various advantages discussed above, it has the disadvantage of a slower transfer speed in comparison with IEEE 1394, which is attracting attention as a similar serial bus interface standard.

The USB 2.0 standard, which implements a data transfer speed of 480 Mbps (high-speed mode), which is much higher than that of the USB 1.1 standard, has been drafted.

However, if data transfer speeds are increased in such a manner, it is clear that there will be a problem concerning the difficulty of completing the previously described bit stuffing and NRZI processing within one clock cycle.

In other words, bit stuffing and NRZI processing is appropriate for serial data processing (processing in which the data is in a serial stream). The parallel data is therefore converted into serial data by the parallel-serial conversion circuit then the bit stuffing is done on the converted serial data, followed by NRZI encoding. For that reason, if the data transfer speed is 480 Mbps as described above, the bit stuffing and NRZI processing must also be done at the clock frequency of 480 MHz. It is therefore necessary to employ the latest semiconductor processes that enable fine processing, making it difficult to implement bit stuffing and NRZI processing in this high-speed mode with a data transfer speed of 480 MHz if it is not possible to use such semiconductor processes.

In order to fabricate a logic circuit that operates at 480 MHz with fine semiconductor processes in which wiring delays are a controlling factor in the critical path for signal timing, there are problems concerning the manual wiring and layout work that is necessary to ensure synchronized operation with minimal clock skew.

The embodiments were devised in the light of the above described technical concerns and has as an objective thereof the provision of a data transfer control device and electronic equipment that make it possible to implement bit insertion, encoding, decoding, or bit deletion at a slow clock frequency.

One embodiment of the present invention relates to a data transfer control device for data transfer over a serial bus, the data transfer control device comprising: a bit insertion circuit which inserts a bit of a second signal level on condition that there is a given number of bits of a first signal level consecutively; and a parallel-serial conversion circuit for converting parallel data into serial data which is transferred over the serial bus, wherein the bit insertion circuit is provided in a stage before the parallel-serial conversion circuit, and wherein the bit insertion circuit receives N-bit parallel input data that has been input at a given clock cycle from a previous-stage circuit and outputs N-bit parallel output data into which a bit has been inserted.

In this embodiment, the bit insertion circuit is provided in a stage before the parallel-serial conversion circuit. It is therefore possible to perform the bit insertion processing in a state in which parallel data has not yet been converted into serial data. This means that the bit insertion circuit can be allowed to operate at a clock frequency of 1/N, by way of example, in comparison with processing in a state in which the data is still in serial form. It is therefore possible to reduce the cost of the data transfer control device because it may not necessary to use the latest semiconductor processes that enable fine processing. Since the signal path for signal timing is also reduced, it is possible to shorten the time required for developing the data transfer control device and also improve the reliability of the operation of the data transfer control device. It is also possible to use existing automatic wiring distribution methods in the creation of the circuit patterns of the data transfer control device. Since this also grants a certain margin in the time required for calculations, it makes it possible to use a method of creating the logic circuitry by a circuit assembly method that uses hardware description language (HDL).

In this embodiment, the bit insertion circuit may perform processing to carry forward a bit that has overflowed due to bit insertion, into data for a next clock cycle.

If N-bit parallel input data is sequentially input in a given clock cycle, it becomes possible to output N-bit parallel output data after bit insertion in a suitable sequence within the same clock cycle, by way of example.

In this embodiment, the bit insertion circuit may comprise: a computation circuit which calculates an insertion position of a bit of the second signal level and number of bits that has overflowed due to the bit insertion; and an accumulated overflow total storage circuit which stores an accumulated overflow total obtained by cumulatively adding or subtracting the calculated number of overflow bits, and the bit insertion circuit may determine the parallel output data to be output, based on the accumulated overflow total, while inserting a bit of the second signal level, based on the bit insertion position.

This makes it possible to use simple processing to determine the bit insertion position and the range of parallel output data to be output.

In this embodiment, the bit insertion circuit may comprise a consecutive number storage circuit which stores consecutive number of bits of the first signal level at a tail end of the parallel output data, and the computation circuit may calculate the bit insertion position, based on the consecutive number stored in a previous clock cycle.

This makes it possible to insert a bit of the second signal level at a suitable bit insertion position.

In this embodiment, the bit insertion circuit may comprise: a data storage circuit which stores parallel input data from at least one clock cycle before a current clock cycle; a data assembly circuit which outputs assembled data that is a assembly of the stored parallel input data from at least one clock cycle before and parallel input data from the current clock cycle; and a selector which selects parallel output data after bit insertion, from the assembled data, based on the accumulated overflow total.

Even when parallel input data has been sequentially input at a given clock cycle from the previous-stage circuit, this configuration makes it possible to perform the bit insertion processing while this parallel input data is stored temporarily in the data storage circuit.

In this embodiment, the bit insertion circuit may output to a previous-stage circuit a signal that stops an input of parallel input data for at least one clock cycle period, when the accumulated overflow total reaches a given value.

This makes it possible to stop the output of parallel input data by the previous-stage circuit, when processing cannot keep up with the sequential input of parallel input data at the given clock cycle from the previous-stage circuit. This prevents any loss of parallel input data from the previous-stage circuit.

This embodiment may comprise an encoder provided between the bit insertion circuit and the parallel-serial conversion circuit, which converts N-bit parallel output data from the bit insertion circuit into N-bit parallel encoded data for a physical layer.

This makes it possible to perform the encoding on data in a state in which is still parallel data, before the conversion into serial data. This allows the encoder to operate at a lower clock frequency of 1/N, by way of example, in comparison with processing on serial data. It is therefore possible to reduce the cost, shorten the development time, and increase the reliability of the data transfer control device.

Another embodiment of the present invention relates to a data transfer control device for providing data transfer over a serial bus, the data transfer control device comprising: a serial-parallel conversion circuit for converting serial data which is transferred over the serial bus into parallel data; and a bit deletion circuit which deletes a bit of a second signal level, on condition that there is a given number of bits of a first signal level consecutively, wherein the bit deletion circuit is provided in a stage after the serial-parallel conversion circuit, and wherein the bit deletion circuit receives N-bit parallel input data that has been input at a given clock cycle through the serial-parallel conversion circuit, and outputs N-bit parallel output data from which a bit have been deleted.

In this embodiment, the bit deletion circuit is provided in a stage after the serial-parallel conversion circuit. It is therefore possible to delete bits while the data is still in a parallel state. This means that the bit deletion circuit can be allowed to operate at a clock frequency of 1/N, by way of example, in comparison with processing in a state in which the data is still in serial form. Since it is therefore not necessary to use the latest semiconductor processes that enable fine processing, the cost of the data transfer control device can be reduced. Since the critical paths relating to signal timing are also reduced, the time required for developing the data transfer control device can be reduced and also the reliability of operation of the data transfer control device can be increased.

In this embodiment, the bit deletion circuit may perform processing for moving up a bit from data of a next clock cycle, for an insufficiency of bit because of a contraction in data length due to bit deletion.

If N-bit parallel input data has been input sequentially at a given clock cycle, this configuration makes it possible to sequentially output N-bit parallel output data from which bits have been deleted, at the same clock cycle, by way of example.

In this embodiment, the bit deletion circuit may comprise: a computation circuit for calculating a deleting position of a bit of the second signal level and a number of bits of which data length is contracted because of bit deletion; and an accumulated contraction total storage circuit for storing an accumulated contraction total obtained by cumulatively adding or subtracting the calculated number of bits of contraction, and the bit deletion circuit may determine parallel output data to be output, based on the accumulated contraction total, while deleting a bit of the second signal level, based on the bit deleting position.

This makes it possible to use simple processing to determine the bit deleting position and the range of parallel output data to be output.

In this embodiment, the bit deletion circuit may comprise a consecutive number storage circuit which stores consecutive number of bits of the first signal level at a tail end of the parallel output data before bit deletion, and the computation circuit may calculate the bit deleting position, based on the consecutive number stored in a previous clock cycle.

This makes it possible to delete a bit of the second signal level at the bit deleting position in a suitable manner.

In this embodiment, the bit deletion circuit may comprise a data storage circuit which stores parallel input data from at least one clock cycle before a current clock cycle; a data assembly circuit which outputs assembled data that is an assembly of the stored parallel input data from at least one clock cycle before and parallel input data from the current clock cycle; and a selector which selects parallel output data after bit deletion, from the assembled data, based on the accumulated contraction total.

If parallel input data has been input sequentially at a given clock cycle through the serial-parallel conversion circuit, this configuration makes it possible to delete bits while this parallel input data is stored temporarily in the data storage circuit.

In this embodiment, the bit deletion circuit may output to a subsequent-stage circuit a signal that stops a fetch of parallel output data for at least one clock cycle period, when the accumulated contraction total has reached a given value.

This makes it possible to stop the fetch of parallel output data by the subsequent-stage circuit, even when there is no more parallel output data to be output to the subsequent-stage circuit because of the bit deletion. This also prevents a state in which parallel output data is output erroneously to the subsequent-stage circuit.

This embodiment may comprise a decoder provided between the serial-parallel conversion circuit and the bit deletion circuit, which decodes N-bit parallel encoded data that has been converted for a physical layer and outputs decoded data to the bit deletion circuit as N-bit parallel input data.

This makes it possible to decode the encoded data while it is still parallel data. This allows the decoder to operate at a clock frequency of 1/N, by way of example, in comparison with processing in a state in which the data is still in serial form. It is therefore possible to reduce the cost, shorten the development time, and increase the reliability of the data transfer control device.

In the data transfer control device according to the above described embodiments, processing to insert a bit of the second signal level on condition that there is a. given number of bits of the first signal level consecutively, may be bit stuffing processing in accordance with the universal serial bus (USB) standard.

Electronic equipment in accordance with a further embodiment comprises any one of the above mentioned data transfer control devices, a device which performs given processing on data received from another device through the data transfer control device and the serial bus; and a device for outputting or storing data that has been subjected to the processing. Electronic equipment in accordance with a still further embodiment of the present invention comprises any one of the above mentioned data transfer control devices, a device which performs given processing on data that is to be transferred to another device through the data transfer control device and the serial bus; and a device for fetching data to be subjected to the processing.

These embodiments make it possible to reduce the cost and increase the reliability of a data transfer control device used in electronic equipment, thereby reducing the cost and increasing the reliability of the electronic equipment itself. These embodiments also make it possible to transfer data in a high-speed transfer mode, enabling an increase in the processing speed of the electronic equipment.

The above described embodiments will now be described with reference to the accompanying figures.

1. Overall Configuration

An example of the overall configuration of a data transfer control device in accordance with one embodiment is shown in FIG. 1.

The data transfer control device of this embodiment comprises a data processing circuit 200, a packet processing circuit 202, an encoder/decoder 204 for high-speed (HS) mode, an encoder/decoder 206 for full-speed (FS) mode, and a signaling circuit 208. Note that the data processing circuit 200, the packet processing circuit 202, and the FS encoder/decoder 206 are optional structural elements; the data transfer control device of this embodiment does not necessarily comprise all of these structural elements.

The data processing circuit 200 is designed to perform processes such as processing in a USB-standard transaction layer or management of the end point, using a FIFO (transmission/reception buffer). The data processing circuit 200 also functions as an interface with components such as an external CPU and a DMA controller.

The packet processing circuit 202 performs processing to assemble packets for transmission by USB or analyze packets received by USB. More specifically, it performs processing such as adding start-of-packet (SOP) and end-of-packet (EOP) codes during transmission, and strips those SOP and EOP codes during reception. This packet processing circuit 202 also performs processing to generate the various timing signals that control data transmission and reception.

The HS encoder/decoder 204 and the FS encoder/decoder 206 encodes data for transfer by USB (during transmission) and decodes data (during reception). The HS encoder/decoder 204 is an encoder/decoder for use in high-speed mode where the data transfer speed is 480 Mbps, and the FS encoder/decoder 206 is an encoder/decoder for use in full-speed mode where the data transfer speed is 12 Mbps.

In this case, high-speed mode is a transfer mode standardized by USB 2.0. Conversely, full-speed mode is a transfer mode that was standardized by the previous USB 1.1.

Since USB 2.0 provides this high-speed mode, makes it possible to implement not only data transfer with printers, audio equipment, and cameras, but also data transfer with storage devices such as hard disk drives and optical disk drives (CD-ROM or DVD).

The signaling circuit 208 performs processing to adjust the waveforms of signals to be sent to other devices by USB, or processing to achieve the synchronization of signals received by USB from other devices, or to extract the data and clock signals therefrom.

The signaling circuit 208 comprises a parallel-serial conversion circuit 210 that converts parallel data output from the HS encoder/decoder 204 or FS encoder/decoder 206 during transmission into serial data. It also comprises a serial-parallel conversion circuit 212 that converts serial data received by USB into parallel data for output to the HS encoder/decoder 204 or the FS encoder/decoder 206.

Figure 2:
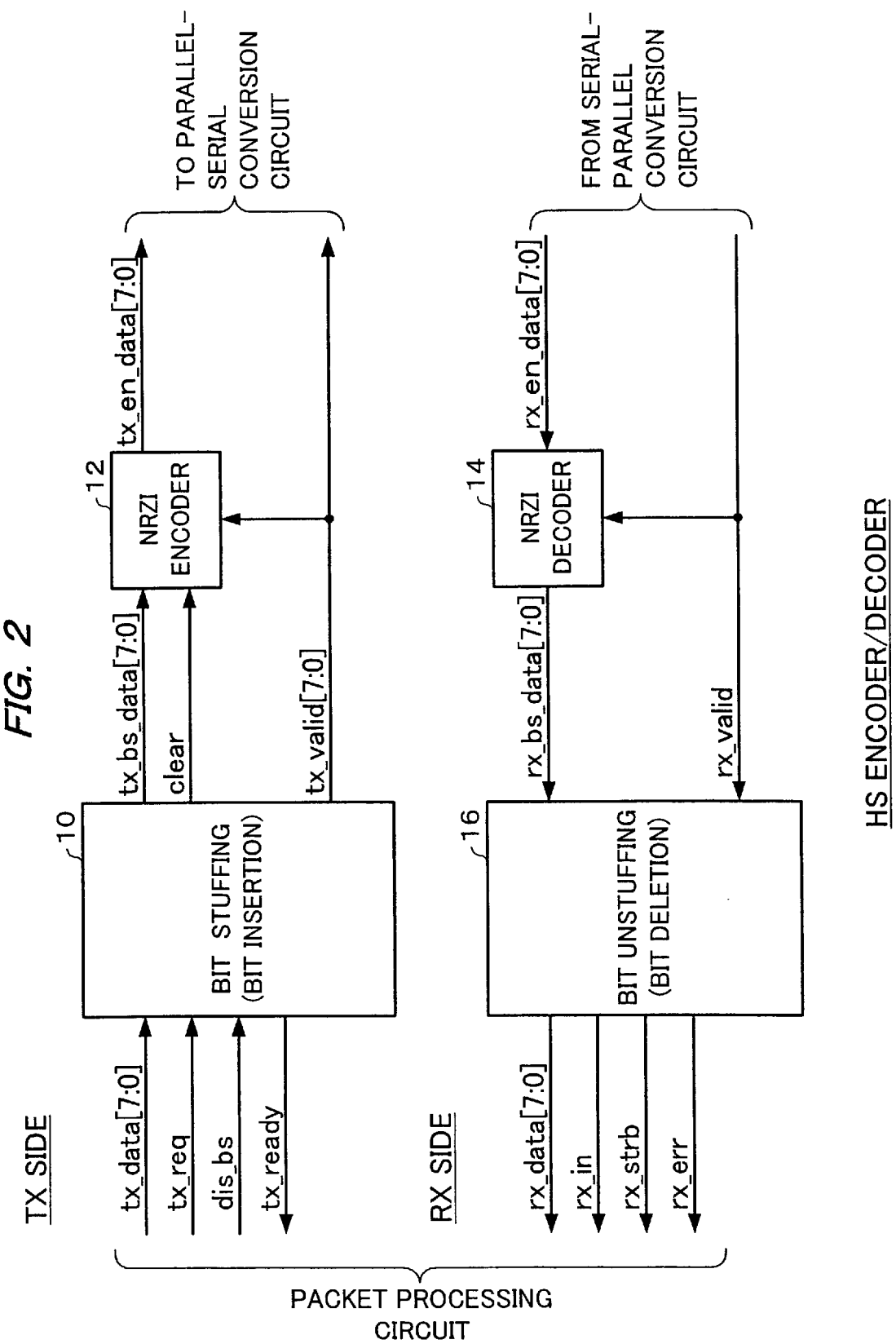
FIG. 2 shows an example of the configuration of the HS encoder/decoder that is an essential part of this embodiment.

An example of the configuration of the HS encoder/decoder 204 that is a vital component of this embodiment is shown in FIG. 2.

The HS encoder/decoder 204 comprises a bit stuffing circuit 10 (broadly speaking: a bit insertion circuit), an NRZI encoder 12 (broadly speaking: an encode for converting parallel data into parallel encoded data for the physical layer), an NRZI decoder 14 (broadly speaking: a decoder for decoding parallel encoded data that has been converted for the physical layer then outputting the decoded parallel data), and a bit unstuffing circuit 16 (broadly speaking: a bit deletion circuit).

In this case, the bit stuffing circuit 10 and the NRZI encoder 12 operate during data transmission (TX) and the NRZI decoder 14 and the bit unstuffing circuit 16 operate during data reception (RX).

The description first concerns the concepts of non-return-to-zero inversion (NRZI) and bit stuffing, with reference to FIGS. 3A and 3B.

NRZI causes the signal level to invert if a bit of the original data is 0, as shown at A1 and A2 in FIG. 3A, or maintains the signal level if a bit in the original data is 1, as shown at A3. If this encoding method is used, the signal level of the data after NRZI will invert at each bit even if there is a string of "0" bits in the original data and thus the signal level has not changed for a long time. It therefore becomes possible to encode data that enables clock extraction when the ratio of occurrence of "0" bits in the original data is much higher than the ratio of occurrence of "1" bits.

However, as is clear from A3 in FIG. 3A, a problem of slippage will occur in PLL synchronization or the like if there is a string of "1" bits in the original data so that signal level of the data after NRZI does not change for a long period of time.

For that reason, USB adopts a process called bit stuffing (broadly speaking: bit insertion). In other words, if there is a sequential string of "1" bits, a "0" bit is always added thereafter, as shown at A4 in FIG. 3B. After the bit stuffing, the data is encoded by NRZI, as shown at A5.

This ensures that the signal level of the NRZI encoded data will invert, as shown at A6 in FIG. 3B, even if there is a string of "1" bits in the original data. This therefore makes it possible to solve the problems caused by a sequential state in which the signal level does not change for a long time, making it possible to obtain data that is optimal for clock extraction.

Note that bit unstuffing is performed on the reception side, to delete the "0" bits that were inserted by the bit-stuffing processing on the transmission side. In other words, if there is a sequential string of six "1" bits with a "0" bit inserted afterwards, that "0" is deleted.

With these NRZI processing, bit stuffing, bit unstuffing methods, the state of the signal level of the current bit is determined by viewing the state of the signal level of the previous bit, and also the volume of data is increased/decreased in bit units, so that these methods are optimal for serial data processing.

For that reason, a bit stuffing circuit 302 and an NRZI encoder 304 are usually provided in a stage after a parallel-serial conversion circuit 300 on the transmission side, as shown by a comparative example in FIG. 4. Bit stuffing and NRZI encoding is performed on the serial data obtained by the conversion of the parallel-serial conversion circuit 300.

On the reception side, on the other hand, an NRZI decoder 306 and a bit unstuffing circuit 308 are usually provided in a stage before a serial-parallel conversion circuit 310. The bit unstuffing and NRZI decoding are done on data that is serial data, then the processed serial data is input to the serial-parallel conversion circuit 310 to obtain parallel data.

With the high-speed mode adopted by USB 2.0, the data transfer speed is 480 Mbps which means that the serial data processing (NRZI processing, bit stuffing, and bit unstuffing) shown at B1 and B2 in the configuration of FIG. 4 must be implemented at a clock frequency of 480 MHz.

It is possible to implement the serial data processing of B1 and B2 at 480 MHz in such a case, provided the latest semiconductor processes that enable fine processing are used.

With an application-specific integrated circuit (ASIC), however, it is preferable to use ordinary semiconductor processes instead of these latest semiconductor processes, from the cost balance viewpoint.

If the circuit patterning of the bit stuffing circuit 302, the NRZI encoder 304, the NRZI decoder 306, and the bit unstuffing circuit 308 is laid out manually with optimal wiring capacity, it is possible for those circuits to achieve operation at 480 MHz even if ordinary semiconductor processes are used therefor.

However, such manual layout work leads to problems concerning a lengthening of the IC development time and erroneous operation of the IC.

The arrangement in accordance with this embodiment has the bit stuffing circuit 10 (bit insertion circuit) provided in a stage before the parallel-serial conversion circuit 210 (see FIG. 1) on the transmission side, as shown in FIG. 2. The configuration of this bit stuffing circuit 10 is such that it receives 8-bit (broadly speaking: N-bit) tx_data (parallel input data) that is input at a given clock cycle from the packet processing circuit 202 (see FIG. 1) in a previous stage, then outputs 8-bit tx_bs_data (parallel output data) that has been subjected to bit stuffing (bit insertion) at the above mentioned clock cycle, by way of example.

In addition, the NRZI encoder 12 that converts the tx_bs_data stream from the bit stuffing circuit 10 into 8-bit tx_en_data (parallel encoded data for the physical layer) is provided between the bit stuffing circuit 10 and the parallel-serial conversion circuit.

The configuration on the reception side is such that the bit unstuffing circuit 16 (bit deletion circuit) is provided in a stage after the serial-parallel conversion circuit 212 of FIG. 1. This bit unstuffing circuit 16 is configured in such a manner that it receives 8-bit (N-bit) rx_bs_data (parallel input data) that is input at a given clock cycle through the serial-parallel conversion circuit, then outputs 8-bit rx_data (parallel output data) that has been subjected to bit unstuffing (bit deletion) at the above mentioned clock cycle, by way of example.

In addition, the NRZI decoder 14 that decodes 8-bit rx_en_data (parallel encoded data that has been converted for the physical layer) and outputs it as the 8-bit rx_bs_data stream (parallel input data) is provided between the serial-parallel conversion circuit and the bit unstuffing circuit 16.

The above-described configuration makes it possible to implement NRZI processing, bit stuffing, and bit unstuffing while the data is still in parallel form. Therefore, if N=8 (bits), by way of example, the bit stuffing circuit 10, the NRZI encoder 12, the NRZI decoder 14, and the bit unstuffing circuit 16 can operate at the low clock frequency of 60 MHz (i.e., 480/8 MHz).

It is therefore possible to implement NRZI processing, bit stuffing, and bit unstuffing even without using the latest semiconductor processes that enable fine processing. As a result, the cost of the data transfer control device can be reduced.

In this embodiment, the patterning of these circuits 10 to 16 can also be done without involving manual layout. It is therefore possible to create the patterning of circuits 10 to 16 with an automatic wiring distribution, such as that of agate array, which shortens the development time and reduces the cost of the data transfer control device.

Since the circuits 10 to 16 can therefore operate at the slow clock frequency of 60 MHz, it is possible to increase their resistance to skew and jitter in the data, thereby greatly increasing the reliability of data transfer.

Figure 5:
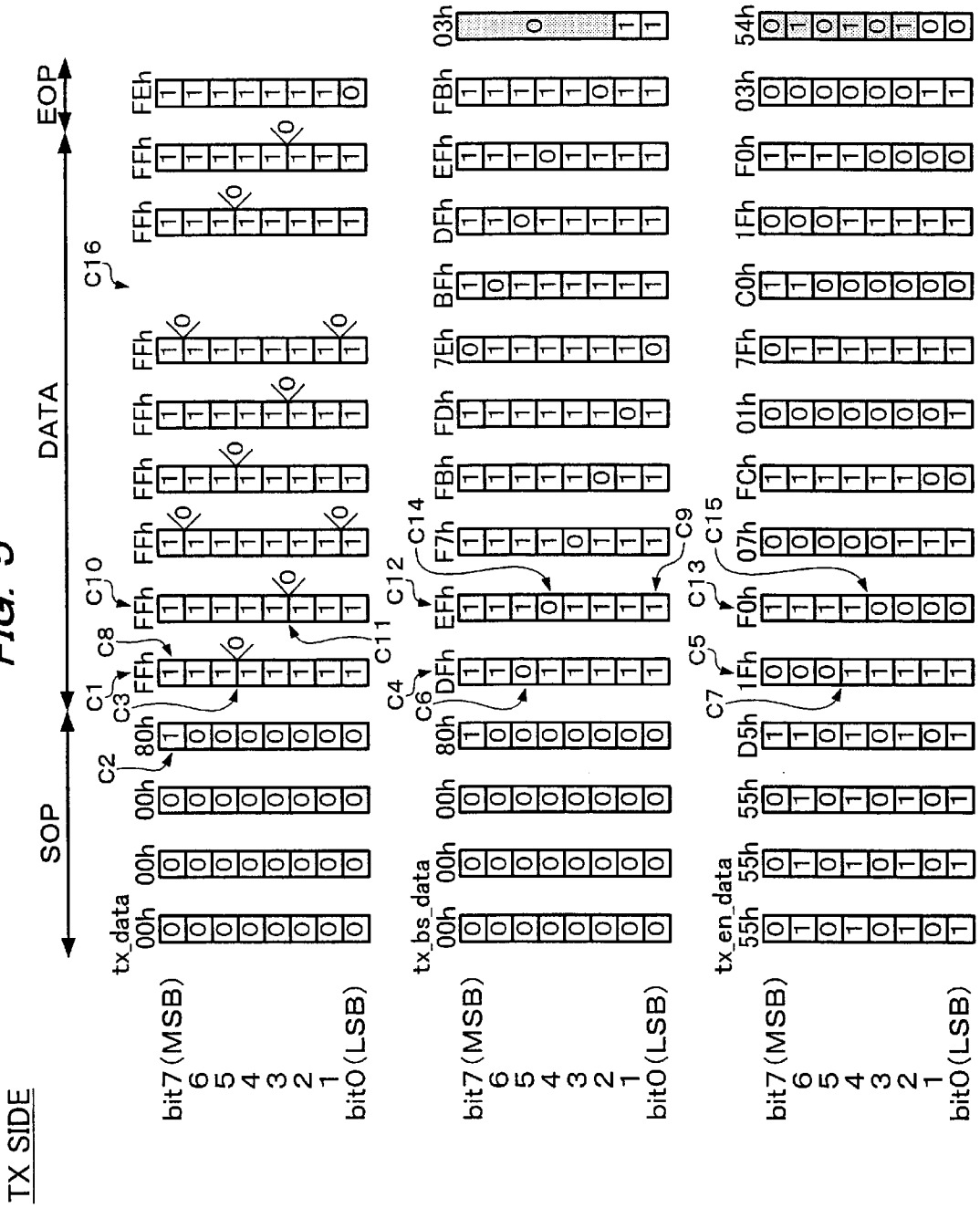
FIG. 5 shows the circumstances of bit stuffing and NRZI encoding on the transmission side.

The bit stuffing and NRZI encoding on the transmission side are shown in FIG. 5.

Note that USB specifies that data is input and output in LSB-first order. In addition, no bit stuffing is done to EOP (FEh) under USB 2.0.

To simplify the description, assume that three bytes (00000008h) are added as the SOP and one byte (FEh) is added as the EOP. The example shown concerns a case in which eight bytes of (FFFFFFFFFFFFFFFFh) data are input as the packet body, even though which is impossible data with the USB packet format.

The shaded portions in FIG. 5 indicate values that can be ignored.

Consider what happens when (FFh) is input to the bit stuffing circuit 10 of FIG. 2 as tx_data, as shown at C1 in FIG. 5. In that case, since the number of consecutive "1" bits in the tail end (MSB side) in the previous clock cycle was one, as shown at C2, a "0" bit is inserted by the bit stuffing processing at the point at which the number of consecutive "1" bits reaches five, as shown at C3.

The tx_bs_data that is output from the bit stuffing circuit 10 of FIG. 2 is therefore (DFh), as shown at C4. This (DFh) is encoded by the NRZI encoder 12 so that (1Fh) is output as tx_en_data, as shown at C5. In other words, the signal level of tx_en_data inverts, as shown at C7, because of the insertion by bits stuffing of a "0" bit as shown at C6. It is therefore easy for the reception side to extract the clock because the signal level of tx_en_data is made to invert even if there is a string of "1" bits.

Note that if a "0" bit is inserted as shown at C3, a bit will overflow as shown at C8. This embodiment is configured in such a manner that this overflow bit is carried forward to the data for the next clock cycle, as shown at C9.

Since the number of "1" consecutive bits in the tail end (last-bits) of the previous clock cycle is two (because of the carried-forward bit from C8), as shown at C10 in FIG. 5, a "0" bit is inserted at the point at which the number of "1" consecutive bits has become four, as shown at C11.

Therefore, the tx_bs_data stream that is output from the bit stuffing circuit 10 is (EFh), as shown at C12. The tx_en_data stream that is then output from the NRZI encoder 12 is (F0h), as shown at C13. In other words, The insertion of the "0" bit shown at C14 inverts the signal level of tx_en_data at C15, making it easy for the reception side to extract the clock.

Since the accumulated total of the number of inserted bits (the accumulated total of the number of overflow bits) is at least eight at C16 in FIG. 5, the input of tx_data from the previous-stage packet processing circuit 202 of FIG. 1 is stopped. This is implemented by deactivating a tx_ready signal of FIG. 2, which is output to the previous-stage packet processing circuit.

Figure 6:
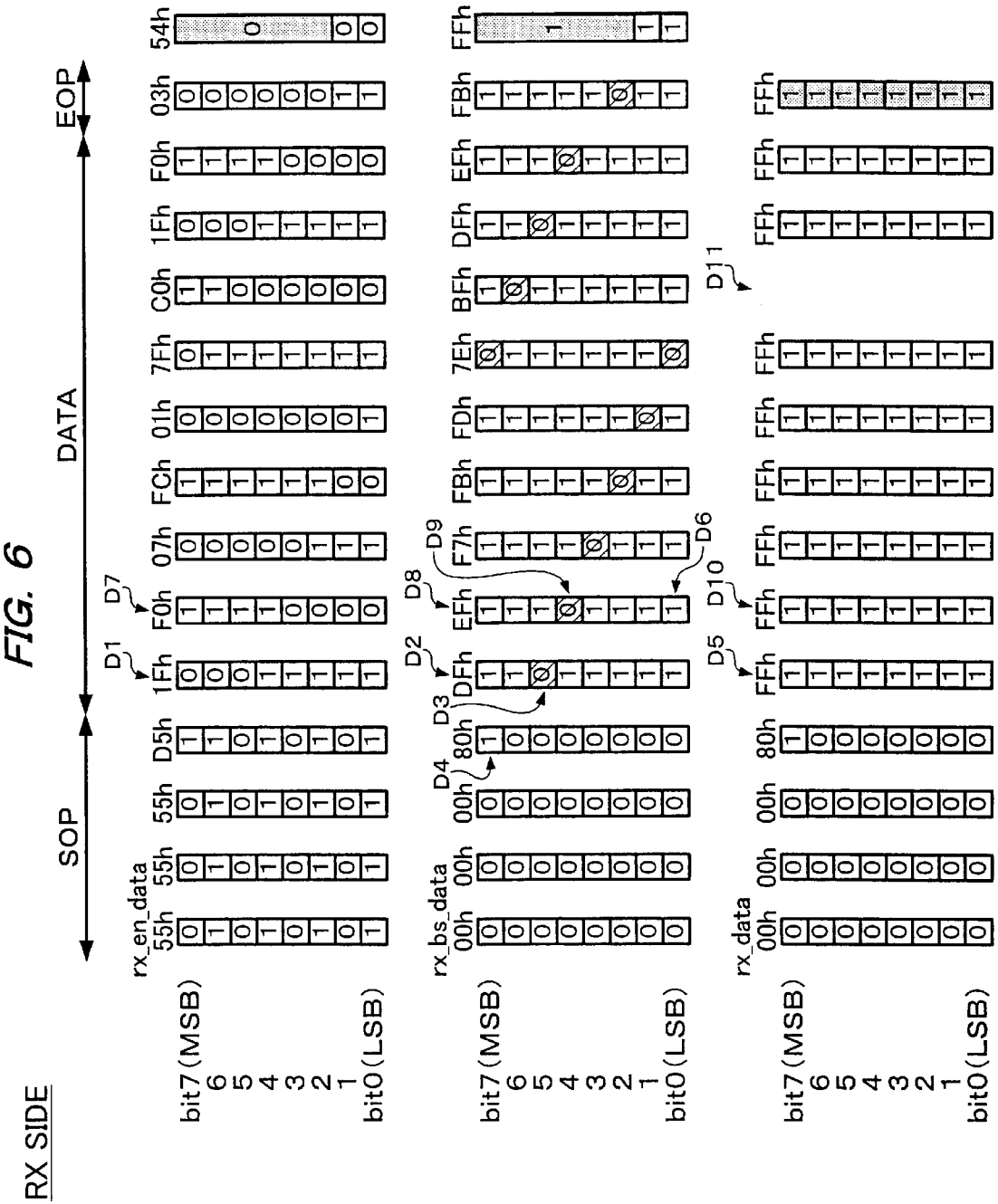
FIG. 6 shows the circumstances of bit unstuffing and NRZI decoding on the reception side.

The NRZI decoding and bit unstuffing on the reception side are shown in FIG. 6.

FIG. 6 shows a case which is similar to that of FIG. 5, where eight bytes of (FFFFFFFFFFFFFFFFh) data are input as the packet body, even though which is impossible data with the USB packet format.

The shaded portions in FIG. 6 indicate values that can be ignored and the diagonally hatched portions indicate "0" bits that have been inserted by the bit stuffing process.

If (1Fh) is input to the NRZI decoder 14 of FIG. 2 as rx_en_data, as shown at D1 in FIG. 6, the rx_bs_data that is output from the NRZI decoder 14 is (DFh), as shown at D2. This (DFh) is data in which a "0" bit has been inserted by the bit stuffing processing of the transmission side (see C6 of FIG. 5), at the position indicated by D3.

If this (DFh) is input to the bit unstuffing circuit 16 of FIG. 2, the "0" bit at D3 is deleted. In other words, since the number of "1" consecutive bits in the tail end (last-bits) of the previous clock cycle is one in this case, as shown at D4, the next "0" bit is deleted by the bit-unstuffing process at the point at which the number of "1" consecutive bits becomes five. The rx_data stream that is output from the bit unstuffing circuit 16 becomes (FFh), as shown at D5.

Note that if a "0" bit is deleted as shown at D3, the length of the data will contract and thus the data length will no longer fill the eight bits. With this embodiment of the invention, the bit shown at D6 is moved up from data in the next clock cycle. If (F0h) is input to the NRZI decoder 14 as rx_en_data, as shown at D7 in FIG. 6, the rx_bs_data stream that is output from the NRZI decoder 14 is (EFh), as shown at D8. This (EFh) is data that had a "0" inserted by the bit stuffing processing of the transmission side (see C14 of FIG. 5) at the position shown at D9.

If this (EFh) is input to the bit unstuffing circuit 16, the "0" bit shown at D9 is deleted. In other words, since the number of "1" consecutive bits in the tail end (last-bits) of the previous clock cycle is three in this case (because the bit at D6 is moved up), the next "0" bit is deleted at the point at which the number of "1" consecutive bits reaches three. This means that the rx_data stream that is output from the bit unstuffing circuit 16 is (FFh), as shown at D10.

Since the accumulated total of deleted bits (accumulated total of number of bits of contraction) has reached at least eight at D11 in FIG. 6, the processing to fetch rx_data by the subsequent-stage packet processing circuit 202 of FIG. 1 is stopped. This is implemented by deactivating the rx_strb signal of FIG. 2, which is output to the subsequent-stage packet processing circuit.

2. Detailed Configurational Examples

The description now turns to detailed examples of the configurations of the circuit blocks of FIG. 2.

2.1 Bit Stuffing Circuit

Figure 7:
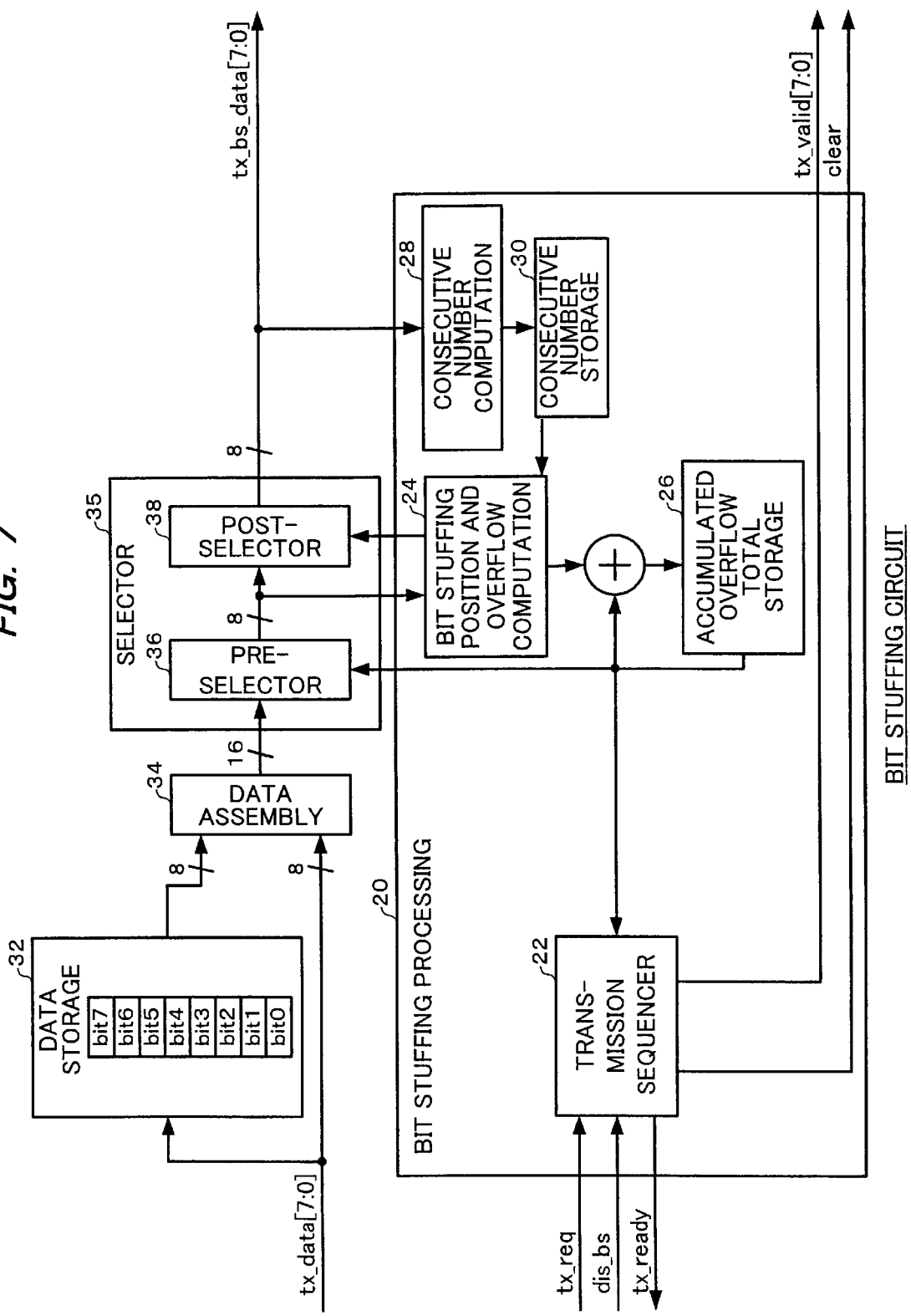
FIG. 7 shows an example of the configuration of the bit stuffing circuit (bit insertion circuit).

An example of the configuration of the bit stuffing circuit 10 of FIG. 2 is shown in FIG. 7.

The bit stuffing circuit 10 comprises a bit stuffing processing circuit 20, a data storage circuit 32, a data assembly circuit 34, and a selector 35 having a pre-selector 36 (pre-shifter) and a post-selector 38 (post-shifter).

In this case, the bit stuffing processing circuit 20 is designed to perform processing to carry forward any bits that have overflowed due to bit insertion, into data for the next clock cycle. It comprises a transmission sequencer 22, a bit stuffing position and overflow computation circuit 24, an accumulated overflow total storage circuit 26, a consecutive number computation circuit 28, and a consecutive number storage circuit 30.

The transmission sequencer 22 generates various signals for bit stuffing and transmission processing. More specifically, it generates control signals for the circuit blocks within the bit stuffing processing circuit 20. It receives a transmission request signal tx_req from the packet processing circuit 202 of FIG. 1 and a bit-stuffing disabled indication signal dis_bs, then outputs a transmission ready signal tx_ready. It also outputs a tx_valid signal, indicating whether or not tx_bs_data is enabled, and a "clear" signal to the subsequent-stage NRZI encoder 12 of FIG. 2.

The bit stuffing position and overflow computation circuit 24 performs processing to calculate the bit stuffing position (the position at which a bit of a second signal level is to be inserted) and the number of bits that have overflowed because of the bit stuffing (bit insertion).

The accumulated overflow total storage circuit 26 stores an accumulated overflow total that is obtained by cumulatively adding (or subtracting) the number of overflow bits that was calculated by the bit stuffing position and overflow computation circuit 24.

With this embodiment, the insertion of each "0" bit for bit stuffing is based on the thus-calculated bit stuffing position. The range of tx_bs_data to be output is determined on the basis of the stored accumulated overflow total.

The consecutive number computation circuit 28 calculates the number of "1" consecutive bits in the tail end of tx_bs_data, then stores that consecutive number in the consecutive number storage circuit 30.

The bit stuffing position and overflow computation circuit 24 calculates the bit stuffing position, based on the number of "1" consecutive bits in the tail end that was stored in the consecutive number storage circuit 30 during the previous clock cycle.

The data storage circuit 32 stores all the bits of tx_data in the previous clock cycle. Note that it is equally possible to store some or all of the bits of tx_data from two clock cycles previously, if necessary, or some or all of the bits of tx_data from any number between 3 and M (where M>4) clock cycles previously.

The data assembly circuit 34 combines all the bits of tx_data from the previous clock cycle, which are stored in the data storage circuit 32, and all the bits of tx_data in the current clock cycle, to output 16-bit assembled data.

The pre-selector 36 selects 8-bit data from this 16-bit assembled data, based on the accumulated overflow total from the accumulated overflow total storage circuit 26, and outputs it to the post-selector 38.

The post-selector 38 receives the 8-bit data from the pre-selector 36, inserts an "0" bit at the bit stuffing position calculated by the bit stuffing position and overflow computation circuit 24, and outputs 8-bit tx_bs_data with a bit inserted.

Figure 8:
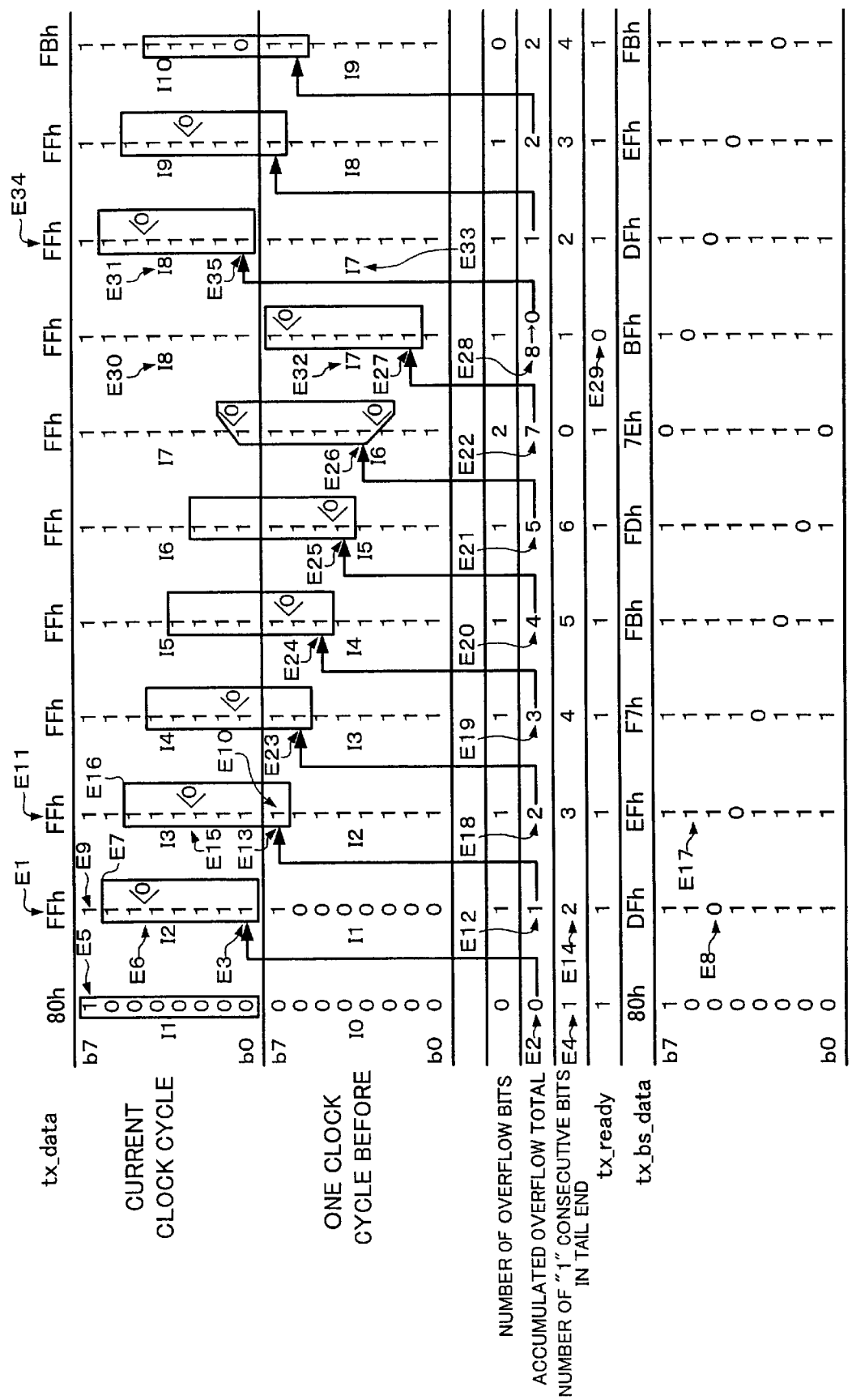
FIG. 8 is illustrative of the operation of the bit stuffing circuit.

The description now turns to details of the operation of the circuity of FIG. 7, with reference to FIG. 8.

Assume that I2=(FFh), which is tx_data of the current clock cycle, and I1=(80h), which is stored in the data storage circuit 32, are input to the data assembly circuit 34, as shown by way of example at E1 in FIG. 8. The data assembly circuit 34 outputs data that has been assembled from these (FFh) and (80h) values to the pre-selector 36.

During this time, the accumulated overflow total stored in the accumulated overflow total storage circuit 26 is zero, as shown at E2 in FIG. 8. The pre-selector 36 that has received this accumulated overflow total from the accumulated overflow total storage circuit 26 therefore selects the 8-bit data from the assembled data, starting from the position indicated by E3.

Since the number of "1" consecutive bits in the tail end (last-bits), which is stored in the consecutive number storage circuit 30, is one, as shown at E4 and E5 in FIG. 8, the bit stuffing position and overflow computation circuit 24 calculates (6−1=5) and posts the position of E6 to the post-selector 38 as the bit stuffing position.

When this happens, the post-selector 38, which has received the 8-bit data from the pre-selector 36 and the bit stuffing position from the bit stuffing position and overflow computation circuit 24, inserts a "0" bit at the specified bit stuffing position. This ensures that the 8-bit data (DFh) shown at E7 is output as tx_bs_data, as shown at E8.

Note that in this case, the bit indicated by E9 of the 8-bit data output from the pre-selector 36 is an overflow bit caused by the bit stuffing, so it is carried forward to the data for the next clock cycle, as shown at E10.

The data assembly circuit 34 combines I3=(FFh) and I2=(FFh) at E11 in FIG. 8, then outputs the result to the pre-selector 36.

During this time, the accumulated overflow total is incremented by 1, to become 1, as shown at E12 in FIG. 8. The pre-selector 36 therefore selects the 8-bit data from the assembled data, starting from the position indicated by E13, for output.

Since the number of "1" consecutive bits in the tail end has now reached two, as shown at E14, the position indicated by E15 is posted to the post-selector 38 as the bit stuffing position.

When this happens, the post-selector 38 inserts a "0" bit at the specified bit stuffing position. This, causes the (EFh) shown at E16 to be output as tx_bs_data, as shown at E17.

The above described sequence causes the sequential output of bit-stuffed tx_bs_data at each clock cycle. Every time a "0" bit is inserted by the bit-stuffing processing, the accumulated overflow total is incremented, as shown at E18, E19, E20, E21, and E22, by way of example. The extraction position for 8-bit data therefore changes as well, as shown at E23, E24, E25, E26, and E27.

When the accumulated overflow total reaches eight, as shown at E28, the accumulated overflow total is initialized back to 0 (if it reaches 9, it is initialized to 1). When that happens, the transmission sequencer 22 of FIG. 7 deactivates the transmission ready signal tx_ready, which is output to the previous-stage packet processing circuit, for one clock cycle period, as shown at E29 in FIG. 8. This stops the input of tx_data for one clock cycle period, as shown at E30 and E31. The fetching of data to the data storage circuit 32 of FIG. 7 is also stopped, as shown at E32 and E33.

At the next clock cycle shown at E34, the accumulated overflow total has been initialized to 0 so that the 8-bit data is extracted from the position shown at E35.

This ensures that this embodiment can extract 8-bit data successfully from the assembled data, with no conflicts, even if the accumulated overflow total has reached 8 or 9 (the given value).

2.2 NRZI Encoder

Figure 9:
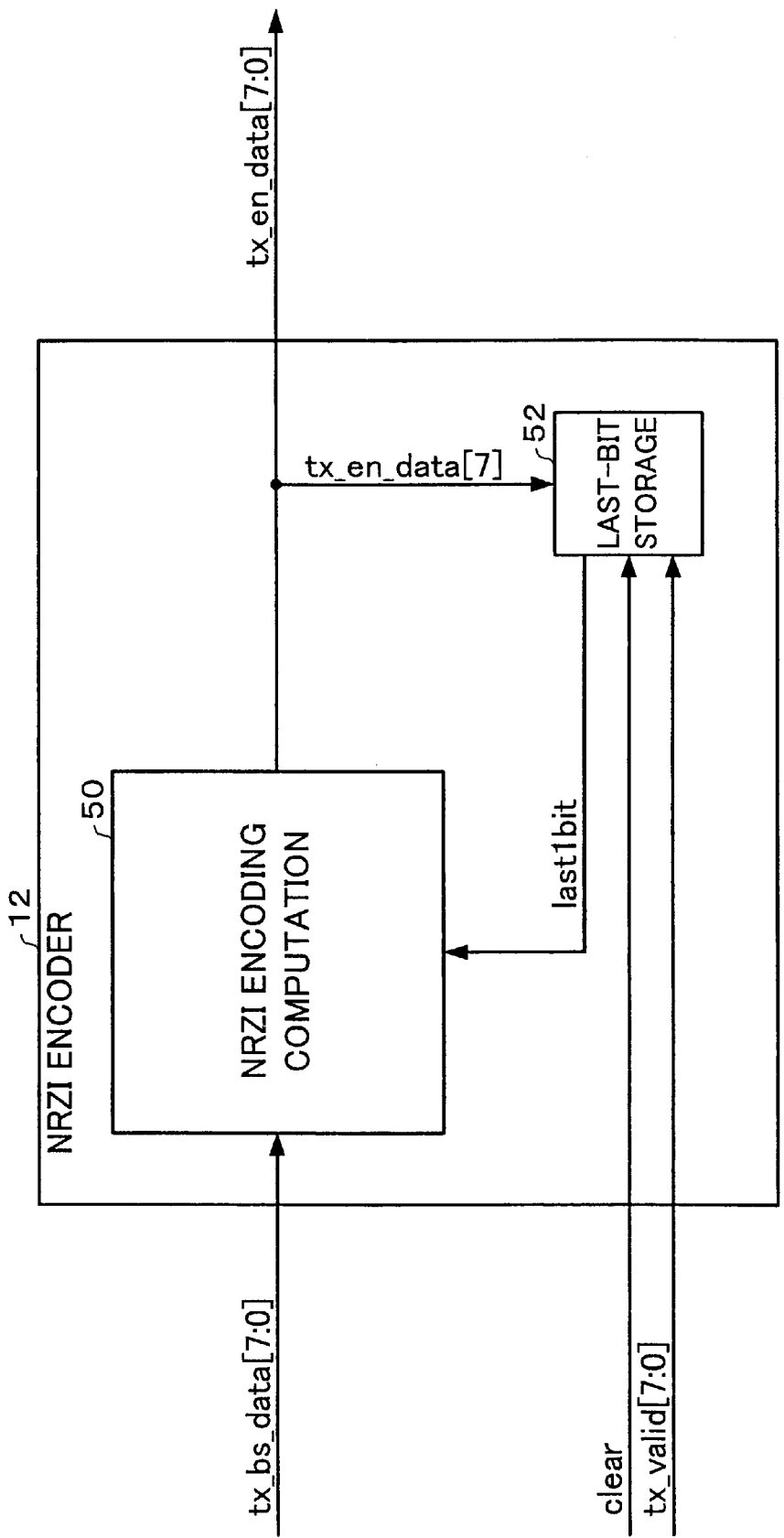
FIG. 9 shows an example of the configuration of the NRZI encoder.

An example of the configuration of the NRZI encoder 12 of FIG. 2 is shown in FIG. 9.

The NRZI encoder 12 comprises an NRZI encoding computation circuit 50 and a last-bit (tail end) storage circuit 52.

In this case, the NRZI encoding computation circuit 50 receives tx_bs_data from the previous-stage bit stuffing circuit 10 and the last1bit from the last-bit storage circuit 52, and outputs tx_en_data after encoding.

The last-bit storage circuit 52 stores the signal level of the bit in the tail end of tx_en_data and outputs it as the last1bit to the NRZI encoding computation circuit 50.

Note that the last-bit storage circuit 52 is reset when the "clear" signal from the previous-stage bit stuffing circuit 10 becomes active. The bit in the tail end of tx_en_data is stored on condition that the tx_valid signal has risen to 1.

Figure 10:
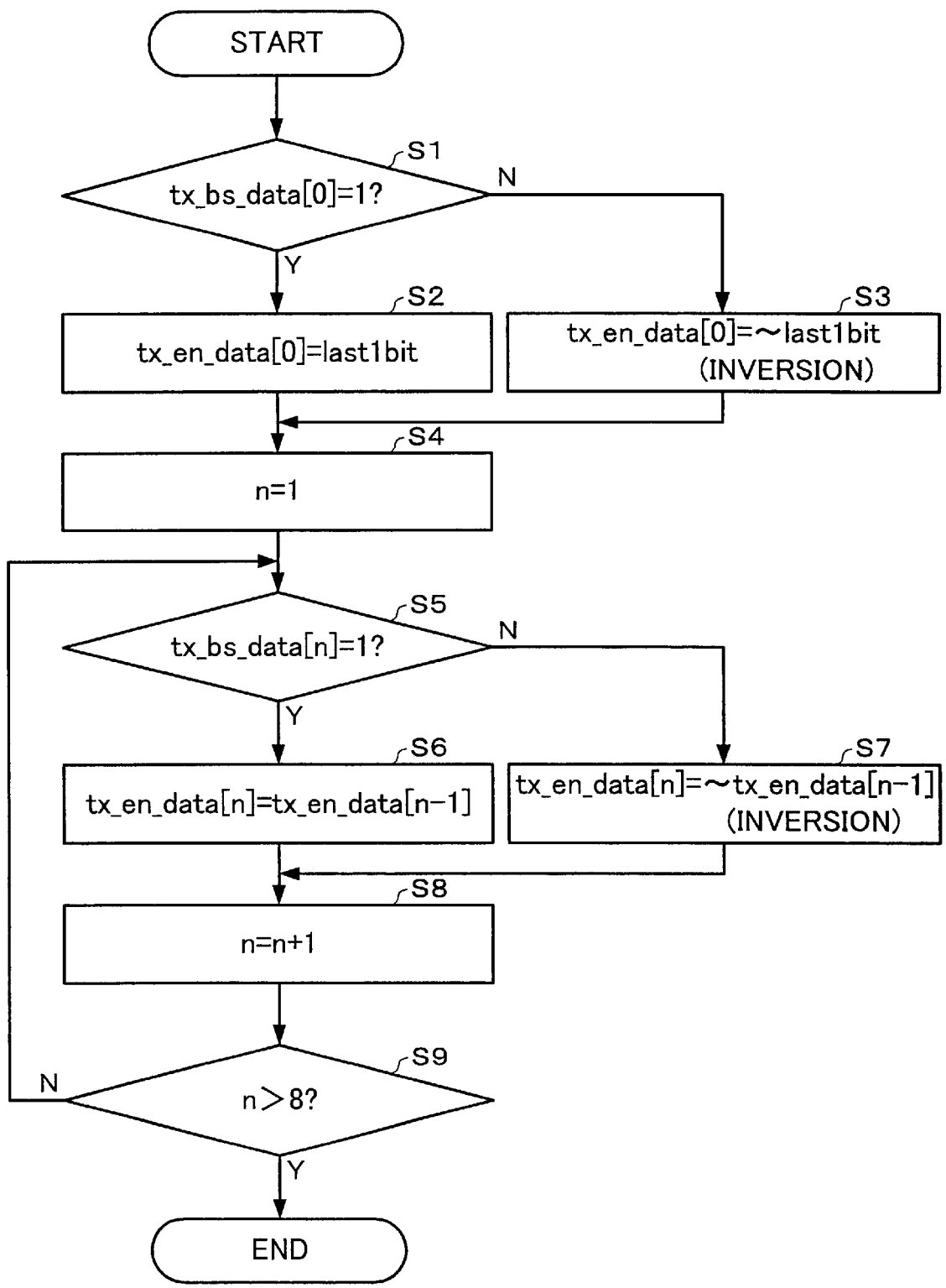
FIG. 10 is a flowchart illustrating the operation of the NRZI encoder.

A flowchart of the operation of the NRZI encoding computation circuit 50 is shown in FIG. 10.

First of all, the system determines whether or not tx_bs_data[0] (bit 0 of tx_bs_data) from the bit stuffing circuit 10 is 1 (step S1).

Figure 11:
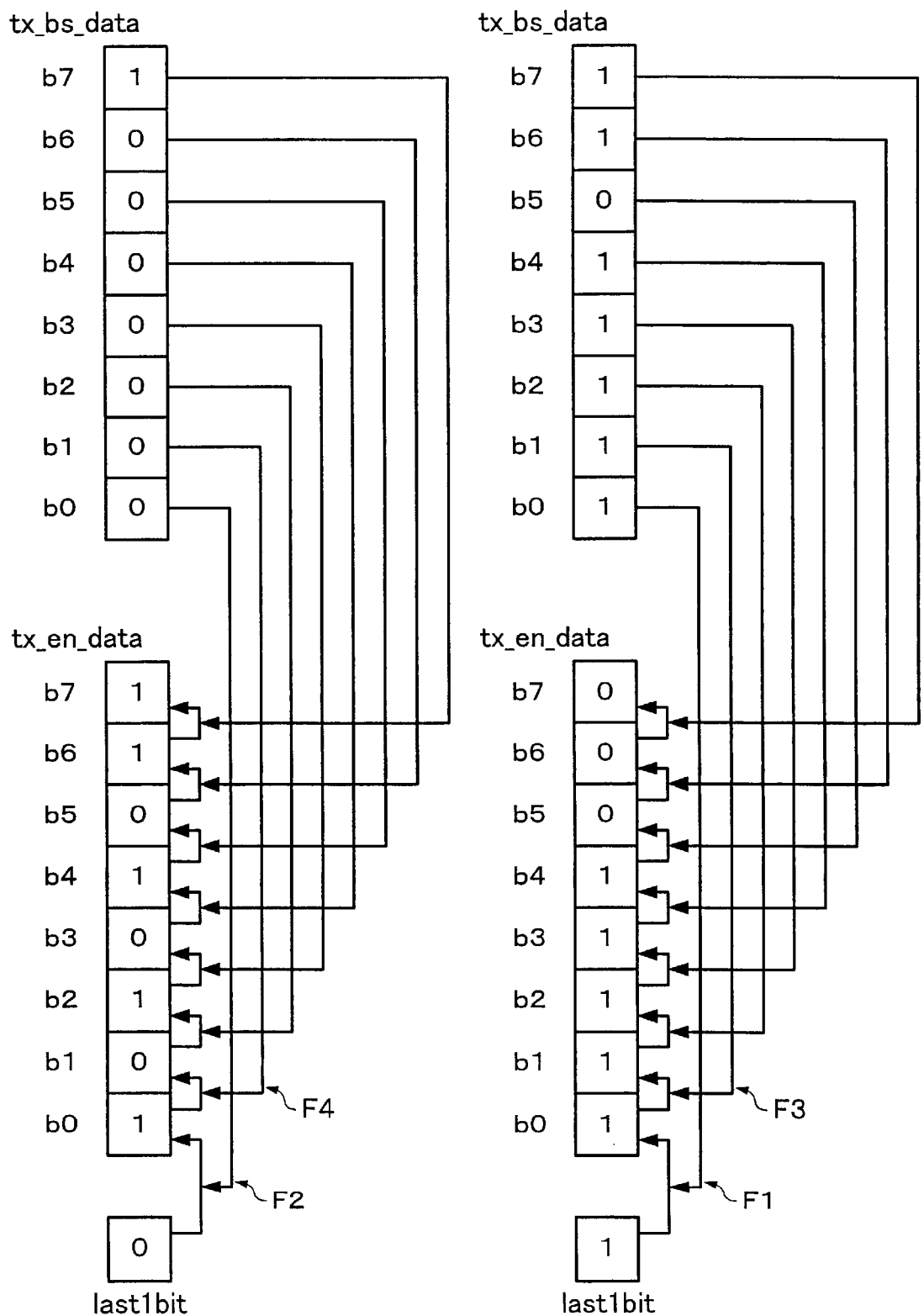
FIG. 11 is illustrative of the operation of the NRZI encoder.

If tx_bs_data[0] is 1, the signal level of tx_en_data[0] is set to the same level as that of the last1bit (step S2). Since the last1bit of tx_bs_data[0] is 1, as shown by way of example at F1 in FIG. 11, tx_en_data[0] becomes 1 (the same signal level as that of the last1bit).

If tx_bs_data[0] is 0, on the other hand, the signal level of tx_en_data[0] is set to the inversion of that of the last1bit (step S3). Since the last1bit of tx_bs_data[0] is 0, as shown by way of example at F2 in FIG. 11, tx_en_data[0] becomes 1 (the opposite signal level from that of the last1bit).

The system then sets n to 1 and determines whether or not tx_bs_data[n] is 1 (steps S4 and S5).

If tx_bs_data[n] is 1, the signal level of tx_bs_data[n] is set to the same signal level as tx_en_data[n−1] (step S6). Since tx_bs_data[1] is the same 1 as tx_en_data[0], as shown by way of example at F3 in FIG. 11, tx_en_data[1] becomes 1 (the same signal level as that of tx_en_data[0]).

If tx_bs_data[n] is 0, on the other hand, the signal level of tx_en_data[n] is set to the opposite signal level from that of tx_en_data[n−1 ] (step S7). Since tx_bs_data[1] is 0 and tx_en_data[0] is 1, as shown by way of example at F4 in FIG. 11, tx_en_data[1] becomes 0 (the opposite signal level from that of tx_en_data[0]).

The system then increments n by one (step S8). All of tx_en_data[n] is obtained by repeating the processing of steps S5 to S8 until n>8 (step S9).

Figure 12:
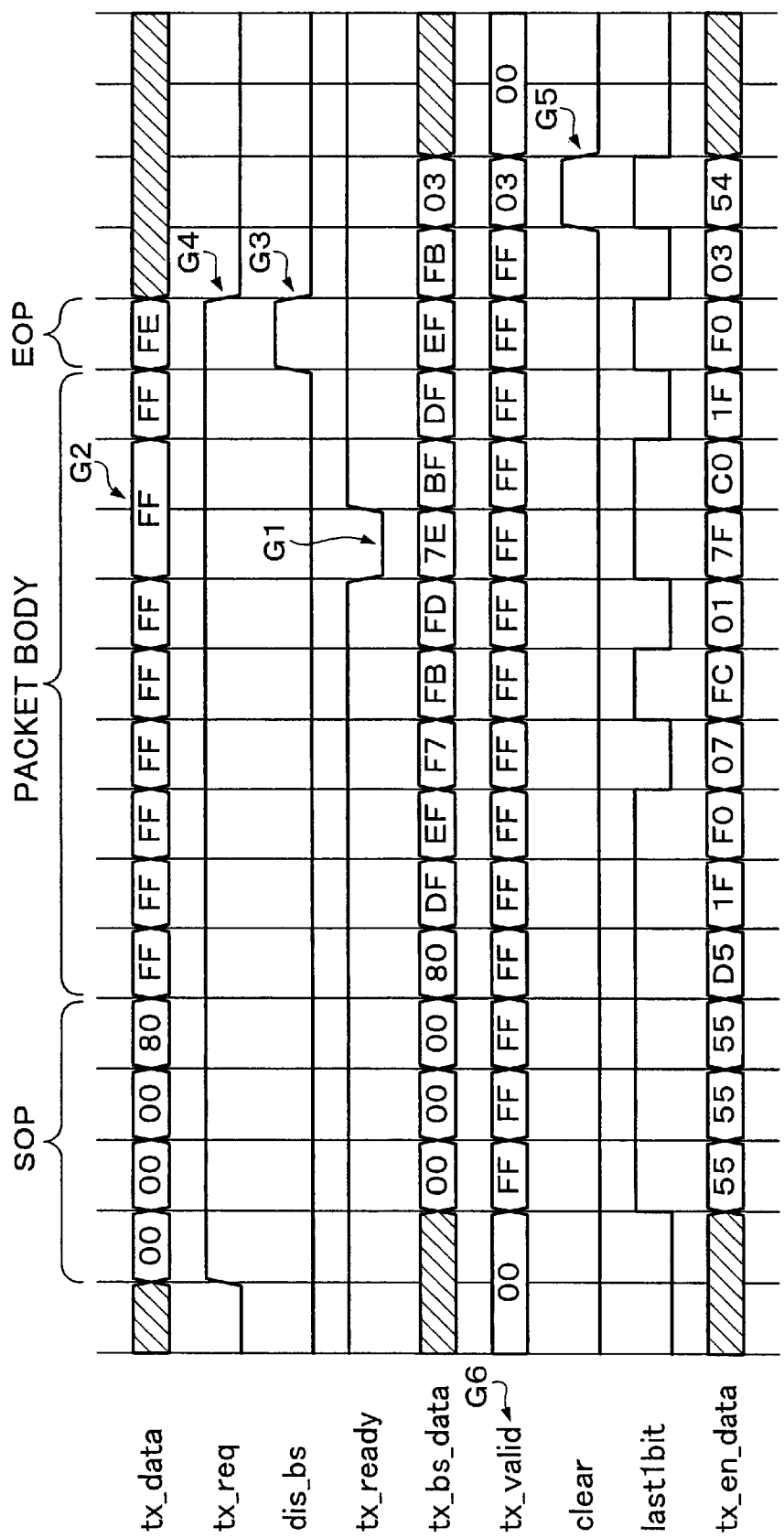
FIG. 12 shows examples of the waveforms of various signals that are input and output by the bit stuffing circuit and the NRZI encoder.

Examples of the waveforms of the various signals that are input and output to the bit stuffing circuit 10 and the NRZI decoder 14 are shown in FIG. 12. Note that tx_bs_data of FIG. 12 is intended to enable sampling at the clock for adjusting the waveforms, so it is delayed by one clock cycle behind tx_bs_data of FIG. 8.

If the accumulated overflow total reaches 8 or 9, as shown at G1 and G2 of FIG. 12, the transmission ready signal tx_ready becomes inactive and tx_data is stopped for one clock cycle period only (see E29, E30, and E31 of FIG. 8).

In addition, dis_bs becomes active when the EOP (FEh) is input, as shown at G3 in FIG. 12, to disable bit stuffing.

Since the transmission request signal tx_req has been made inactive, the "clear" signal becomes active two clock cycles later, by way of example, and the last-bit storage circuit 52 of FIG. 9 is reset, as shown at G4 and G5.

The tx_valid signal shown at G6 becomes 1 only when tx_bs_data is enabled.

2.3 NRZI Decoder

Figure 13:
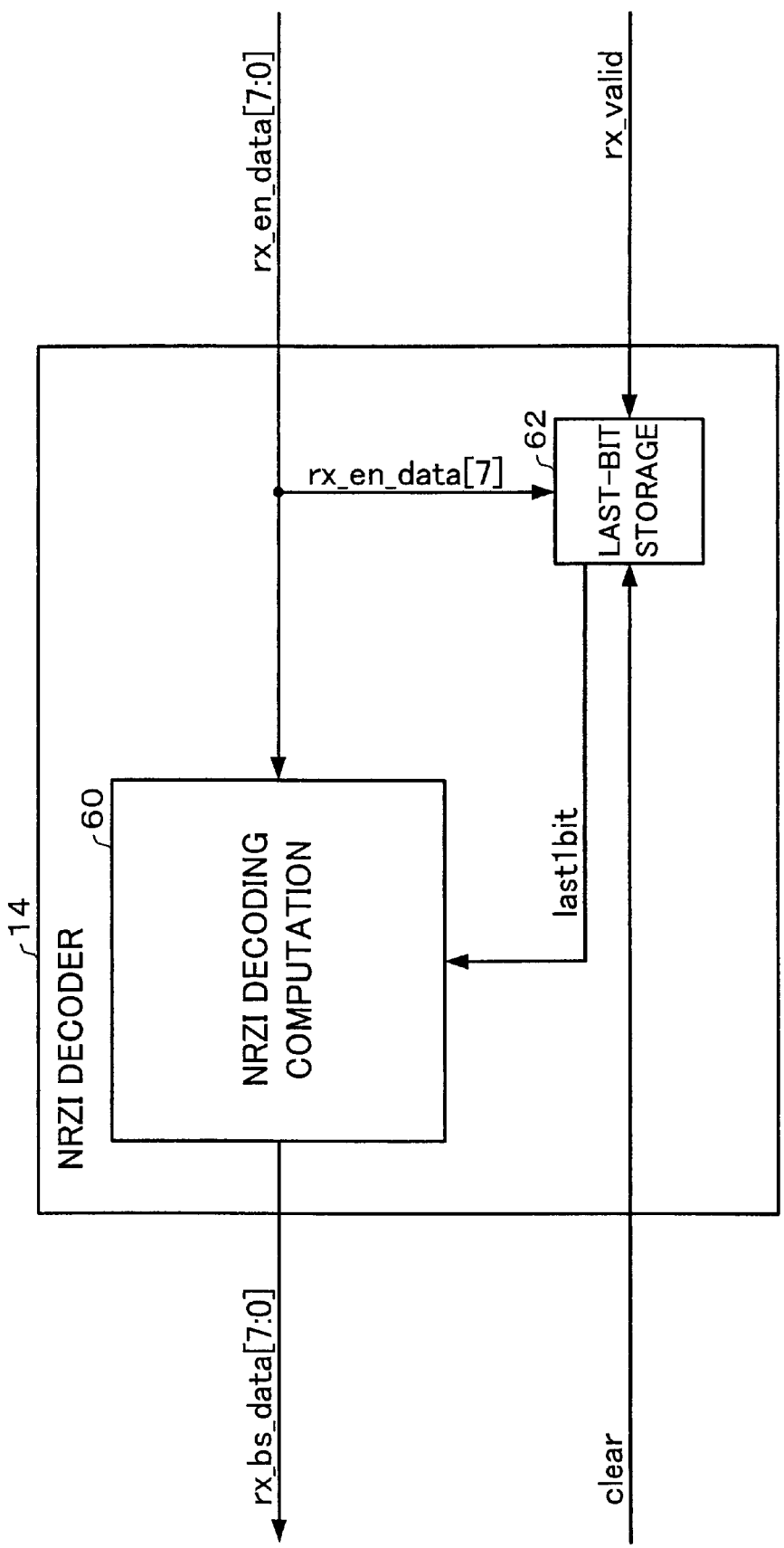
FIG. 13 shows an example of the configuration of the NRZI decoder.

An example of the configuration of the NRZI decoder 14 of FIG. 2 is shown in FIG. 13.

The NRZI decoder 14 comprises a NRZI decoding computation circuit 60 and a last-bit storage circuit: 62.

In this case, the NRZI decoding computation circuit 60 receives rx_en_data from the previous-stage serial-parallel conversion circuit 212 of FIG. 1 and the last1bit from the last-bit storage circuit 62, and outputs rx_bs_data after decoding.

The last-bit storage circuit 62 stores the signal level of the bit in the tail end of rx_en_data, then outputs it as the last1bit to the NRZI decoding computation circuit 60.

Note that the last-bit storage circuit 62 is reset when the "clear" signal becomes active.

The bit in the tail end of rx_en_data is stored on condition that the rx_valid signal has risen to 1.

Figure 14:
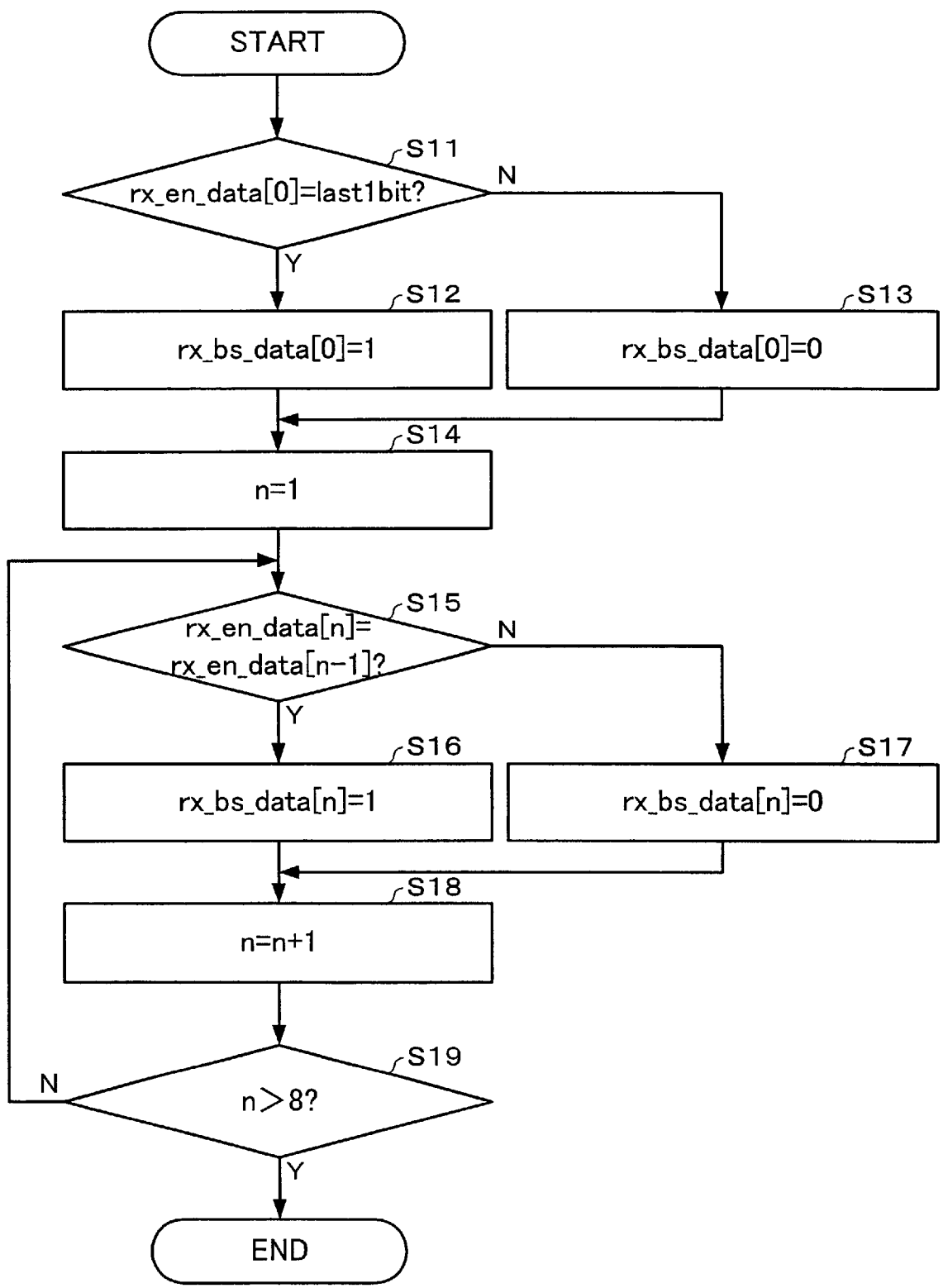
FIG. 14 is a flowchart illustrating the operation of the NRZI decoder.

A flowchart of the operation of the NRZI decoding computation circuit 60 is shown in FIG. 14.

First of all, the system determines whether or not the signal level of rx_en_data[0] (bit 0 of rx_en_data) from the previous-stage serial-parallel conversion circuit is the same as the signal level of the last1bit (step S11).

Figure 15:
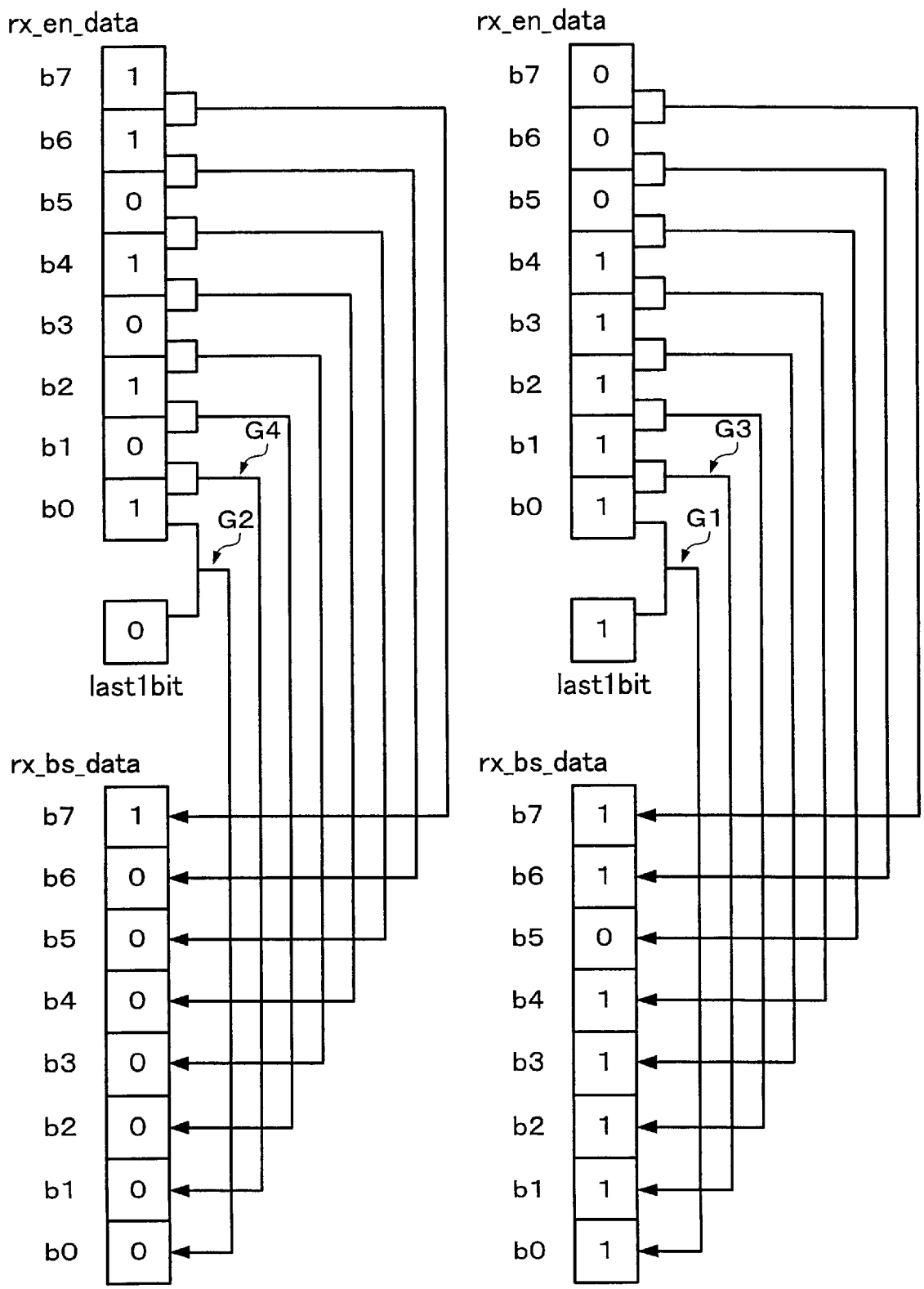
FIG. 15 is illustrative of the operation of the NRZI decoder.

If the signal level of rx_en_data[0] is the same as that of the last1bit, rx_bs_data[0] becomes 1 (step S12). Since rx_en_data[0] is the same as the last1bit, which is 1, as shown at G1 in FIG. 15, rx_bs_data[0] becomes 1.

If the signal level of rx_en_data[0] is not the same as that of the last1bit, on the other hand, rx_bs_data[0] becomes 0 (step S13). Since rx_en_data[0] is 1 and the last1bit is 0, as shown at G2 in FIG. 15, rx_bs_data[0] becomes 0.

The system then sets n to 1 and determines whether or not the signal level of rx_en_data[n] is the same as the signal level of rx_en_data[n−1 ] (steps S14 and S15).

If the signal level of rx_en_data[n] is the same as that of rx_en_data[n−1], rx_bs_data[n] becomes 1 (step S16). Since rx_en_data[1] and rx_en_data[0] are both 1, as shown by way of example at G3 in FIG. 15, rx_bs_data[1] becomes 1.

If the signal level of rx_en_data[n] is not the same as that of rx_en_data[n−1 ], on the other hand, rx_bs_data[n]

becomes 0 (step S17). Since rx_en_data[1] is 0 and rx_en_data[0] is 1, as shown by way of example at G4 of FIG. 15 rx_bs_data[1] becomes 0.

The system then increments n by one (step S18). All of rx_bs_data[n] is obtained by repeating the processing of steps S15 to S18 until n>8 (step S19).

2.4 Bit Unstuffing Circuit

Figure 16:
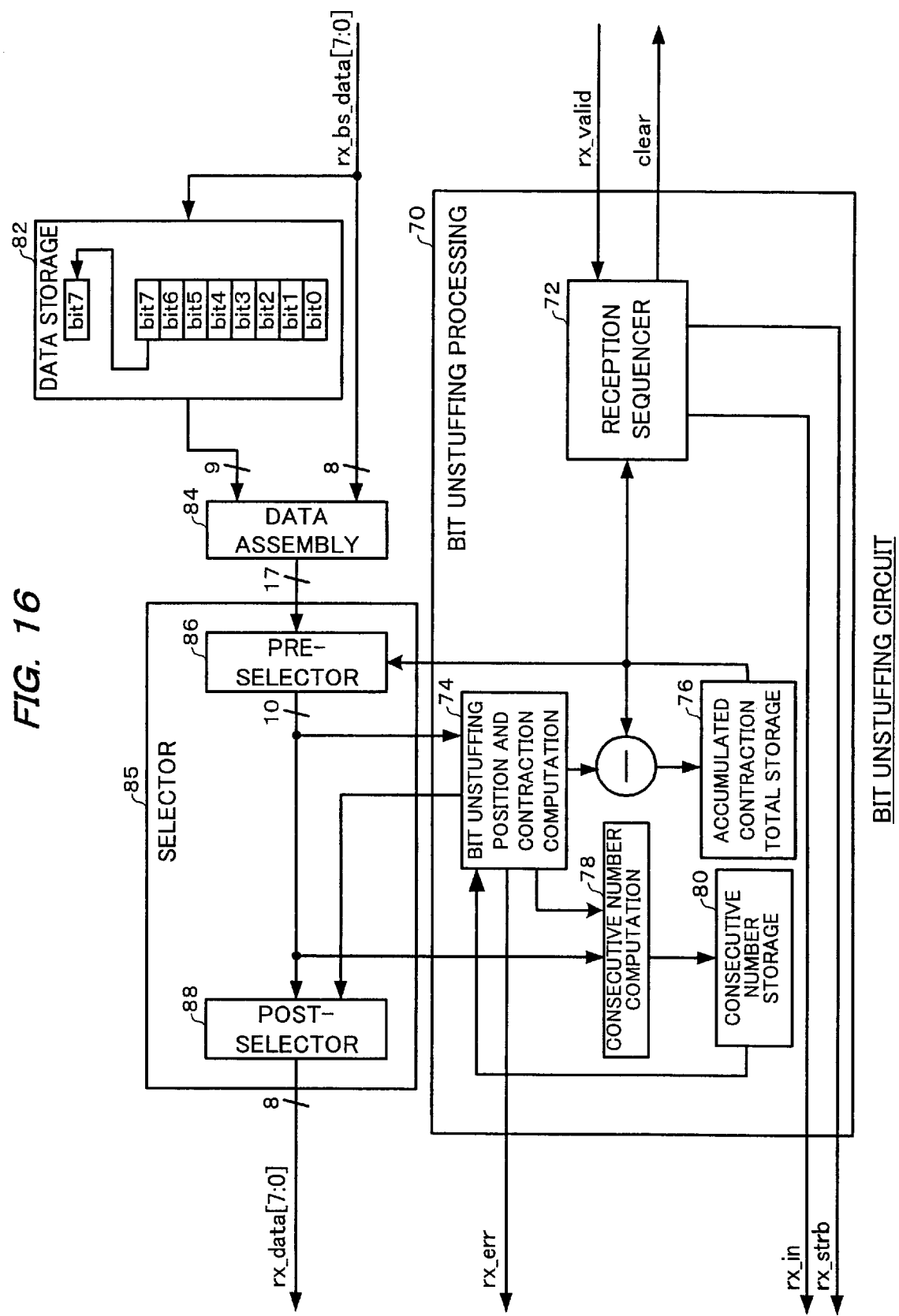
FIG. 16 shows an example of the configuration of the bit unstuffing circuit (bit deletion circuit).

An example of the configuration of the bit unstuffing circuit 16 of FIG. 2 is shown in FIG. 16.

The bit unstuffing circuit 16 comprises a bit unstuffing processing circuit 70, a data storage circuit 82, a data assembly circuit 84, and a selector 85 having a pre-selector 86 (pre-shifter) and a post-selector 88 (post-shifter).

In this case, the bit unstuffing processing circuit 70 performs processing for moving up a bit of data that has become insufficient because of a contraction of data length caused by bit deletion, from data of the next clock cycle. It comprises a reception sequencer 72, a bit unstuffing position and contraction computation circuit 74, an accumulated contraction total storage circuit 76, a consecutive number computation circuit 78, and a consecutive number storage circuit 80.

The reception sequencer 72 generates the various signals used in bit unstuffing and reception processing. More specifically, it generates control signals for the circuit blocks within the bit unstuffing processing circuit 70. It receives the rx_valid signal from the previous-stage serial-parallel conversion circuit 212 of FIG. 1, and outputs the "clear" signal, rx_in, and rx_strb.

The bit unstuffing position and contraction computation circuit 74 performs processing to calculate a bit unstuffing position (a position where a bit of a second signal level is to be deleted) and the number of bits of contraction in the data length.

The accumulated contraction total storage circuit 76 stores an accumulated contraction total obtained by cumulatively subtracting (or adding) the number of bits of contraction obtained by the bit unstuffing position and contraction computation circuit 74 from an initial value.

With this embodiment of the present invention, each "0" bit that was inserted by the bit-stuffing processing on the transmission side is deleted, based on the thus calculated bit unstuffing position. The range of rx_data to be output is determined from the thus stored accumulated contraction total.

The consecutive number computation circuit 78 calculates the number of "1" consecutive bits in the tail end of rx_data before the bit unstuffing (the number of "1" consecutive bits in the tail end of the data selected by the post-selector 88 from the output of the pre-selector 86) and stores that consecutive number in the consecutive number storage circuit 80.

The bit unstuffing position and contraction computation circuit 74 bases the calculation of the bit unstuffing position on the number of "1" consecutive bits in the tail end stored in the consecutive number storage circuit 80 during the previous cycle.

The data storage circuit 82 stores bit 7 (the last1bit) from two clock cycles previously and all the bits of rx_bs_data from the previous clock cycle. Note that it is equally possible to store all of the bits of rx_bs_data from two clock cycles previously, if necessary, or some or all of the bits of rx_bs_data from any number between 3 and M (where M>4) clock cycles previously.

The data assembly circuit 84 combines bit 7 of rx_bs_data from two clock cycles previously, which is stored in the data storage circuit 82, plus all the bits of rx_bs_data from the previous clock cycle and all the bits of rx_bs_data of the current cycle, and outputs 17-bit assembled data.

The pre-selector 86 selects 10-bit data from this 17-bit assembled data, based on the accumulated contraction total from the accumulated contraction total storage circuit 76, and outputs it to the post-selector 88.

The post-selector 88 receives the 10-bit data from the pre-selector 86, deletes each "0" bit at the bit unstuffing position calculated by the bit unstuffing position and contraction computation circuit 74, then outputs the 8-bit rx_data after the bits have been deleted.

Figure 17:
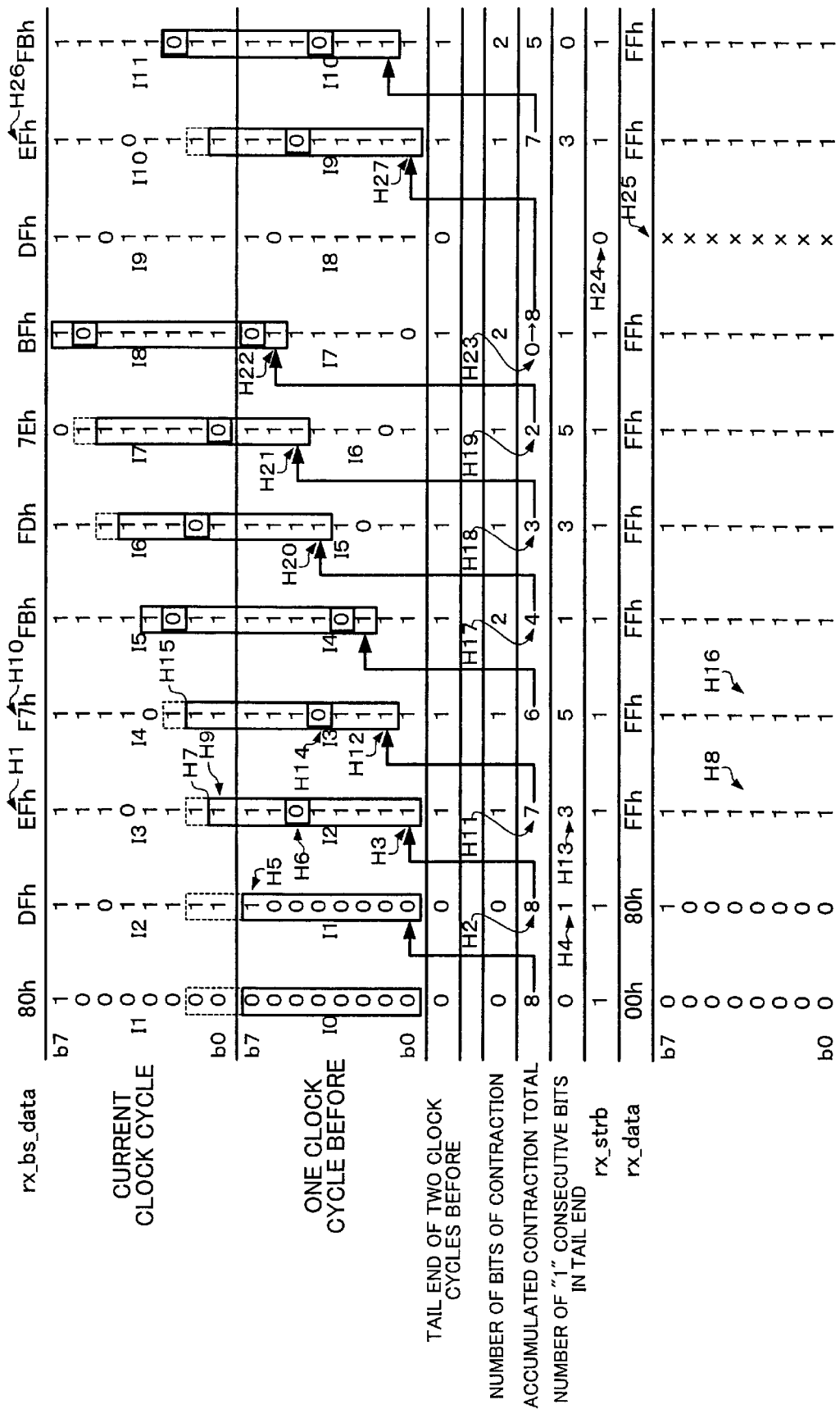
FIG. 17 is illustrative of the operation of the bit unstuffing circuit.

The description now turns to the operation of the circuitry of FIG. 16, with reference to FIG. 17.

I3 (EFh), which is rx_bs_data of the current clock cycle as shown by way of example at H1 in FIG. 17, I2 (DFh), from the previous clock cycle, and the last1bit of I1 in the last-but-one clock cycle are combined by the data assembly circuit 84 and the thus-assembled data is output to the pre-selector 86.

During this time, the accumulated contraction total that is stored in the accumulated contraction total storage circuit 76 reaches eight (the initial value), as shown at H2 in FIG. 17. On receiving this accumulated contraction total, the pre-selector 86 therefore selects 10-bit data from the assembled data, starting at the start bit at the position indicated by H3, and outputs it.

Since the number of "1" consecutive bits in the tail end, which is stored in the consecutive number storage circuit 80 is one, as shown at H4 and H5 in FIG. 17, the bit unstuffing position and contraction computation circuit 74 calculates (6−1)=5 and posts the position at H6 to the post-selector 88 as the bit unstuffing position.

When this happens, the post-selector 88 which has received the 10-bit data from the pre-selector 86 and the bit unstuffing position from the bit unstuffing position and contraction computation circuit 74 then deletes the "0" bit at the specified bit unstuffing position. This ensures that the 8-bit data (FFh) shown at H7 is output as rx_data, as shown at H8.

Note that the bit indicated at H9, which causes a gap because of the bit deletion in this case, is moved up from the data I3 of the next clock cycle after the data I2.

At H10 in FIG. 17, the data assembly circuit 84 combines I4 (F7h), I3 (EFh), and the last1bit of I2, for output to the pre-selector 86.

During this time, the accumulated contraction total is decremented by one, as shown at H11. The pre-selector 86 therefore selects 10-bit data from this assembled data, starting at the bit at the position indicated by H12, for output.

Since the number of "1" consecutive bits in the tail end is now three, as shown at H13, the position indicated by H14 is posted to the post-selector 88 as the bit unstuffing position.

When that happens, the post-selector 88 deletes the "0" bit at the specified bit unstuffing position. This ensures that the (FFh) data shown at H15 is output as rx_data, as shown at H16.

The above-described process causes the bit-unstuffed rx_data to be output sequentially at each clock cycle. The accumulated contraction total will decrease at each deletion of a "0" bit by the bit-unstuffing processing, as shown by way of example at H17, H18, and H19. This will also change the position from which the 10-bit data is extracted, as shown at H20, H21, and H22.

When the accumulated contraction total reaches zero, as shown at H23, it is initialized to 8 (if it reaches 1, it is initialized to 9). When that happens, the reception sequencer 72 of FIG. 16 deactivates the reception strobe signal rx_strb, which is output to the subsequent-stage packet processing circuit, for one clock cycle period only, as shown at H2 in FIG. 17. This stops the fetch of rx_data for one clock cycle period only, as shown at H25.

In the next clock cycle, as shown at H26, the 10-bit data is extracted from the position shown at H27 because the accumulated contraction total has been initialized to 8.

This ensures that this embodiment can extract 10-bit data successfully from the assembled data, with no conflicts, even if the accumulated contraction total has reached 0 or 1 (the given value).

Figure 18:
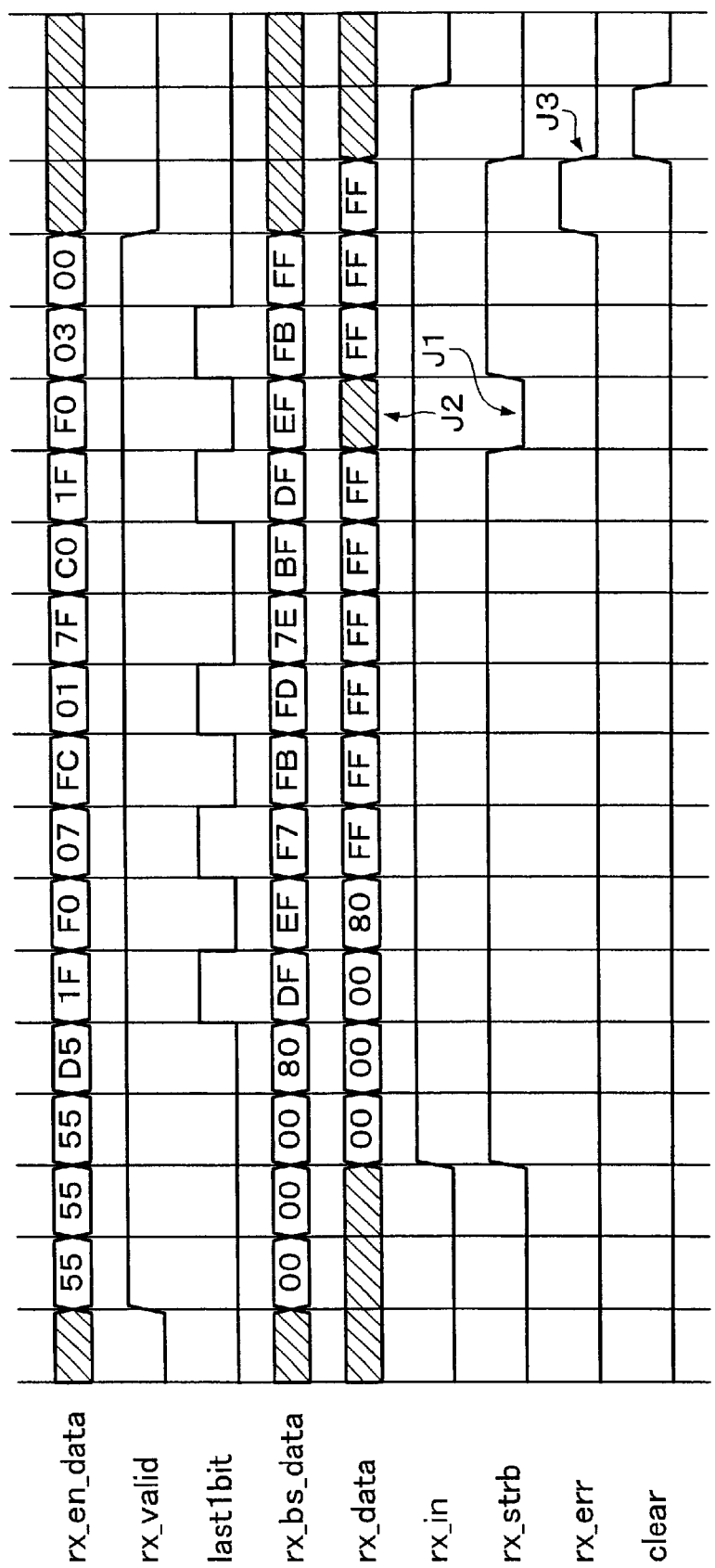
FIG. 18 shows examples of the waveforms of signals that are input and output by the bit unstuffing circuit and the NRZI decoder.

Examples of the waveforms of various signals that are input and output by the NRZI decoder 14 and the bit unstuffing circuit 16 are shown in FIG. 18. Note that rx_data and rx_strb in FIG. 18 are sampled at a clock that is used for waveform adjustment, so they are delayed by one clock cycle from the versions of rx_data and rx_strb shown in FIG. 17.

When the accumulated contraction total reaches 8 or 9, as shown at J1 and J2 in FIG. 18, the reception strobe signal rx_strb goes inactive and the fetch of rx_data is stopped for one clock cycle period, as shown at J1 and J2 in FIG. 18 (compare with H24 and H25 in FIG. 17).

No bit stuffing is done to the EOP by the transmission side, as described with reference to G3 in FIG. 12. When the reception side receives EOP, therefore, a bit stuffing error is generated and a reception error signal rx_err goes active, as shown at J3 in FIG. 18. In other words, the reception side detects the EOP by detecting a bit stuffing error.

3. Electronic Equipment

The description now turns to examples of electronic equipment comprising the data transfer control device of this embodiment of the invention.

Figure 19A:
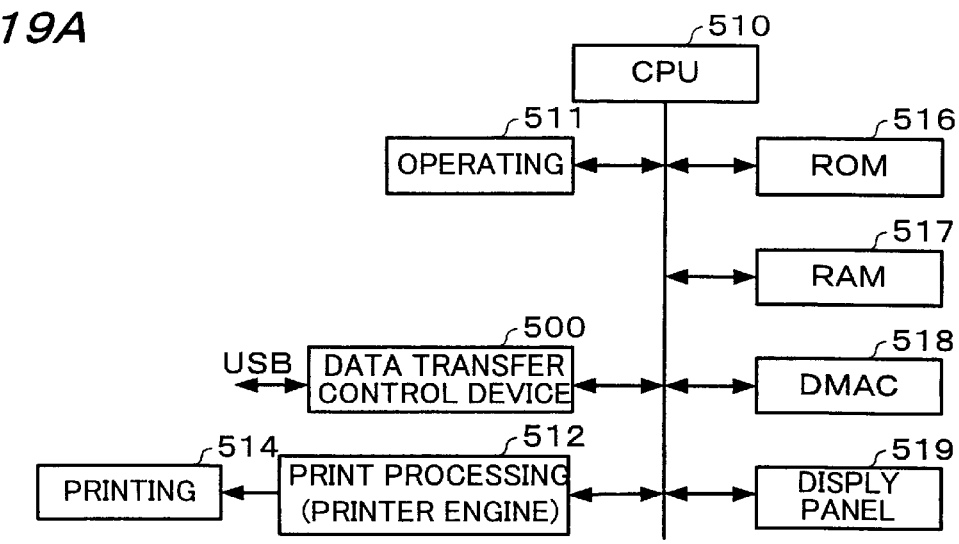
FIGS. 19A, 19B, and 19C shows internal block diagrams of various items of electronic equipment.
Figure 20A:
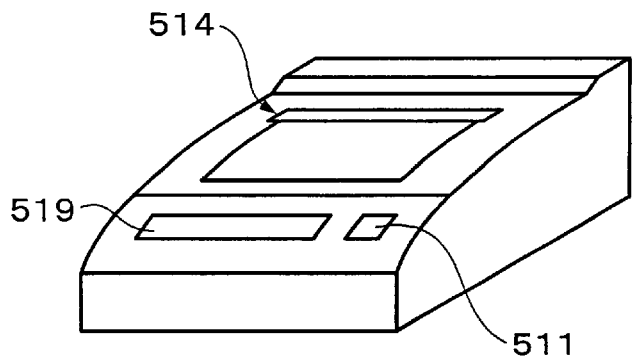
FIGS. 20A, 20B, and 20C shows external views of various items of electronic equipment.

An internal block diagram of a printer that is one example of such electronic equipment is shown in FIG. 19A with an external view thereof being shown in FIG. 20A. A CPU (microcomputer) 510 has various functions, including that of controlling the entire system. An operating section 511 is designed to enable the user to operate the printer. Data such as a control program and fonts is stored in a ROM 516, and a RAM 517 functions as a work area for the CPU 510. A DMAC 518 is a DMA controller for transferring data through the CPU 510. A display panel 519 is designed to inform the user of the operational state of the printer.

Serial print data that has been sent in from another device such as a personal computer over a USB bus is converted into parallel print data by a data transfer control device 500. The thus converted parallel print data is sent to a print processing section (a printer engine) 512 by the CPU 510 or the DMAC 518. This parallel print data is subjected to given processing in the print processing section 512 and is output for printing to paper by a print section (a device for outputting data) 514 comprising components such as a print head.

Figure 19B:
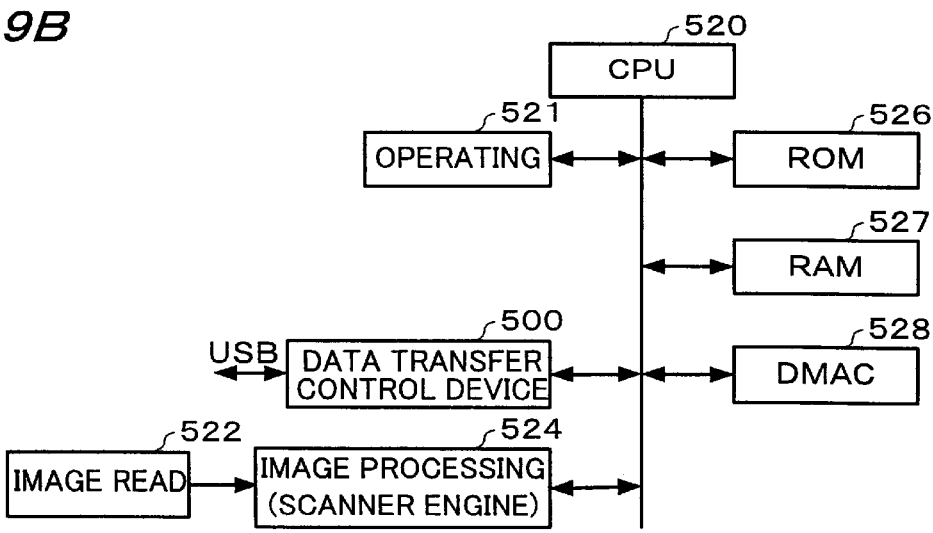
Figure 20B:
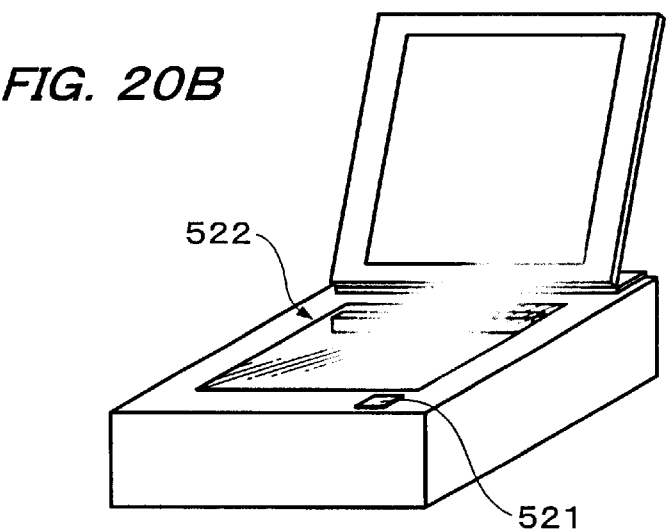

An internal block diagram of a scanner that is another example of electronic equipment is shown in FIG. 19B with an external view thereof being shown in FIG. 20B. A CPU 520 has various functions, including that of controlling the entire system. An operating section 521 is designed to enable the user to operate the scanner. Data such as a control program is stored in a ROM 526, and a RAM 527 functions as a work area for the CPU 520. A DMAC 528 is a DMA controller.

An image of a document is read in by an image read section (a device for fetching data) 522, which comprises components such as a light source and an opto-electric converter, and data of the read-in image is processed by an image processing section 524 (a scanner engine). The processed image data is sent directly to the data transfer control device 500 by the CPU 520 or DMAC 528. The data transfer control device 500 converts that parallel data into serial data and sends it to another device such as a personal computer over a USB bus.

Figure 19C:
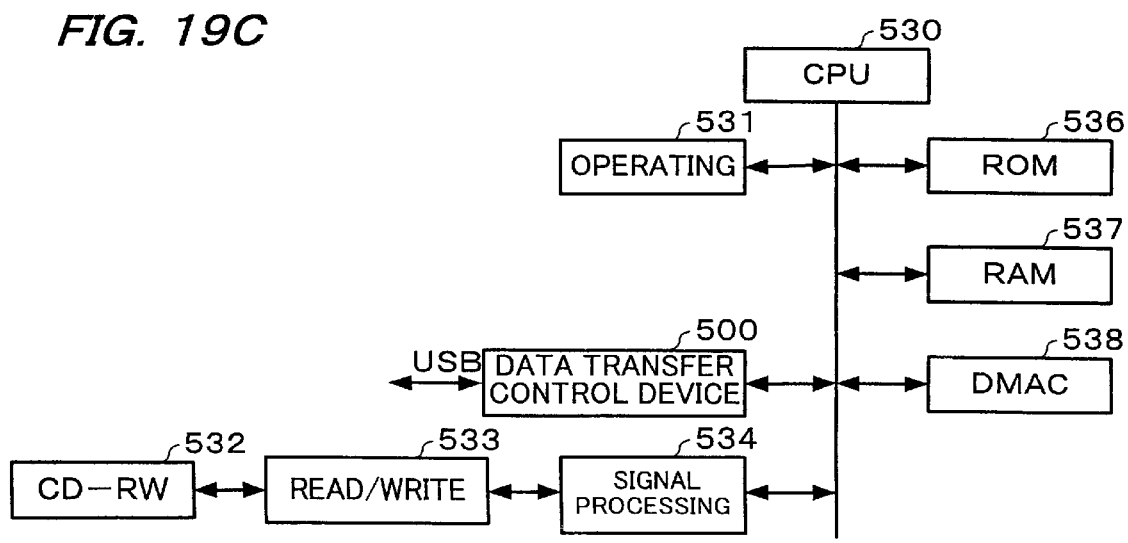
Figure 20C:
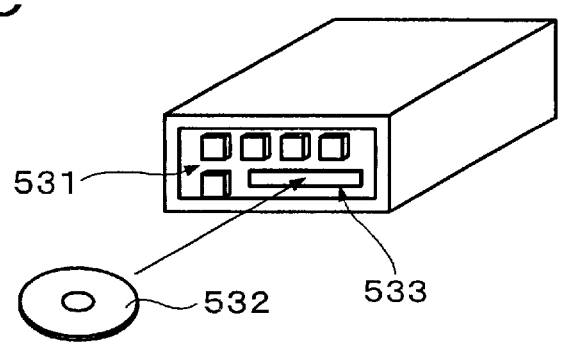

An internal block diagram of a CD-RW drive that is a further example of electronic equipment is shown in FIG. 19C with an external view thereof being shown in FIG. 20C. A CPU 530 has various functions, including that of controlling the entire system. An operating section 531 is designed to enable the user to operate the CD-RW. Data such as a control program is stored in a ROM 536, and a RAM 537 functions as a work area for the CPU 530. A DMAC 538 is a DMA controller.

Data read out from a CD-RW 532 by a read/write section (a device for fetching data or a device for storing data) 533, which comprises components such as a laser, a motor, and an optical system, is input to a signal processing section 534 where it is subjected to given signal processing such as error correction. The data that has been subjected to this signal processing is sent to the data transfer control device 500 by the CPU 530 or the DMAC 538. The data transfer control device 50C converts this parallel data into serial data, then sends it to another device such as a personal computer over a USB bus.

Serial data that comes in from another device over the USB bus, on the other hand, is converted into parallel data by the data transfer control device 500. This parallel data is sent to the signal processing section 534 by the CPU 530 or the DMAC 538. This parallel print data subjected to given signal processing by the signal processing section 534 then is stored by a read/write section 533 into the CD-RW 532.

Note that a separate CPU for data transfer control by the data transfer control device 500 could be provided in addition to the CPU 510, 520, or 530 of FIG. 19A, 19B, or 19C.

Use of the data transfer control device of this embodiment of the present invention in electronic equipment makes it possible to transfer data in the high-speed mode laid down by USB 2.0. When a user uses a personal computer or the like to specify a printout, it is therefore possible to complete printing with a only a small time lag. Similarly, the user can view an image that is read in with only a small time lag after a scanner has been instructed to fetch the image. It also makes it possible to read data from a CD-RW and write data to a CD-RW at high speed.

Use of the data transfer control device of this embodiment of the present invention in electronic equipment also enables the fabrication of an IC for the data transfer control device by ordinary semiconductor processes, which have low fabrication costs. It is therefore possible to reduce the price of the data transfer control device and thus reduce the price of the electronic equipment. Since the number of components that operate at high speed during data transfer control can be reduced, it is possible to increase the reliability of data transfer, thus increasing the reliability of the electronic equipment.

Note that the electronic equipment that can employ a data transfer control device in accordance with the present invention is not limited to the above described embodiments, and thus various other examples can be considered, such as various types of optical disk drive (CD-ROM or DVD), magneto-optical disk drives (MO), hard disk drives, TVs, VCRs, video cameras, audio equipment, telephones, projectors, personal computers, electronic organizers, and dedicated wordprocessors.

Note also that the present invention is not limited to the embodiments described herein, and various modifications are possible within the scope of the invention laid out herein.

For example, the configuration of the data transfer control device in accordance with the present invention is not limited to that shown in FIG. 1 or FIG. 2.

Similarly, the configurations of the bit insertion circuit, encoder, decoder, and bit deletion circuit could be implemented in various different ways, other than the specific examples described with reference to FIGS. 7, 9, 13, and 16.

The present invention can be applied to data transfer under USB 2.0, but it is not limited thereto. For instance, the present invention can also be applied to data transfer in accordance with a standard that is based on a concept similar to that of USB 2.0, or a standard that is developed from USB 2.0.

What is claimed is:

1. A data transfer control device for data transfer over a serial bus, the data transfer control device comprising:
    a bit insertion circuit which inserts a bit of a second signal level on condition that there is a given number of bits of a first signal level consecutively; and
    a parallel-serial conversion circuit for converting parallel data into serial data which is transferred over the serial bus,
    wherein the bit insertion circuit is provided in a stage before the parallel-serial conversion circuit, and
    wherein the bit insertion circuit receives N-bit parallel input data that has been input at a given clock cycle from a previous-stage circuit and outputs N-bit parallel output data into which a bit has been inserted, and
    wherein the bit insertion circuit includes:
    a computation circuit which calculates an insertion position of a bit of the second signal level and number of bits that has overflowed due to the bit insertion; and
    an accumulated overflow total storage circuit which stores an accumulated overflow total obtained by cumulatively adding or subtracting the calculated number of overflow bits, and
    wherein the bit insertion circuit determines the parallel output data to be output, based on the accumulated overflow total, while inserting a bit of the second signal level, based on the bit insertion position.

2. The data transfer control device as defined in claim 1,
    wherein the bit insertion circuit comprises a consecutive number storage circuit which stores consecutive number of bits of the first signal level at a tail end of the parallel output data, and
    wherein the computation circuit calculates the bit insertion position, based on the consecutive number stored in a previous clock cycle.

3. The data transfer control device as defined in claim 1,
    wherein the bit insertion circuit comprises:
    a data storage circuit which stores parallel input data from at least one clock cycle before a current clock cycle;
    a data assembly circuit which outputs assembled data that is a assembly of the stored parallel input data from at least one clock cycle before and parallel input data from the current clock cycle; and
    a selector which selects parallel output data after bit insertion, from the assembled data, based on the accumulated overflow total.

4. The data transfer control device as defined in claim 1,
    wherein the bit insertion circuit outputs to a previous-stage circuit a signal that stops an input of parallel input data for at least one clock cycle period, when the accumulated overflow total reaches a given value.

5. The data transfer control device as defined in claim 1, further comprising:
    an encoder provided between the bit insertion circuit and the parallel-serial conversion circuit, which converts N-bit parallel output data from the bit insertion circuit into N-bit parallel encoded data for a physical layer.

6. A data transfer control device for providing data transfer over a serial bus, the data transfer control device comprising:
    a serial-parallel conversion circuit for converting serial data which is transferred over the serial bus into parallel data; and
    a bit deletion circuit which deletes a bit of a second signal level, on condition that there is a given number of bits of a first signal level consecutively,
    wherein the bit deletion circuit is provided in a stage after the serial-parallel conversion circuit, and
    wherein the bit deletion circuit receives N-bit parallel input data that has been input at a given clock cycle through the serial-parallel conversion circuit, and outputs N-bit parallel output data from which a bit have been deleted and
    wherein the bit deletion circuit comprises:
    a computation circuit for calculating a deleting position of a bit of the second signal level and a number of bits of which data length is contracted because of bit deletion; and
    an accumulated contraction total storage circuit for storing an accumulated contraction total obtained by cumulatively adding or subtracting the calculated number of bits of contraction,
    wherein the bit deletion circuit determines parallel output data to be output, based on the accumulated contraction total, while deleting a bit of the second signal level, based on the bit deleting position.

7. The data transfer control device as defined in claim 6,
    wherein the bit deletion circuit comprises a consecutive number storage circuit which stores consecutive number of bits of the first signal level at a tail end of the parallel output data before bit deletion, and
    wherein the computation circuit calculates the bit deleting position, based on the consecutive number stored in a previous clock cycle.

8. The data transfer control device as defined in claim 6,
    wherein the bit deletion circuit comprises:
    a data storage circuit which stores parallel input data from at least one clock cycle before a current clock cycle;
    a data assembly circuit which outputs assembled data that is an assembly of the stored parallel input data from at least one clock cycle before and parallel input data from the current clock cycle; and
    a selector which selects parallel output data after bit deletion, from the assembled data, based on the accumulated contraction total.

9. The data transfer control device as defined in claim 6,
    wherein the bit deletion circuit outputs to a subsequent-stage circuit a signal that stops a fetch of parallel output data for at least one clock cycle period, when the accumulated contraction total has reached a given value.

10. The data transfer control device as defined in claim 6, further comprising:

a decoder provided between the serial-parallel conversion circuit and the bit deletion circuit, which decodes N-bit parallel encoded data that has been converted for a physical layer and outputs decoded data to the bit deletion circuit as N-bit parallel input data.

11. The data transfer control device as defined in claim 1, wherein processing to insert a bit of the second signal level on condition that there is a given number of bits of the first signal level consecutively, is bit stuffing processing in accordance with the universal serial bus (USB) standard.

12. The data transfer control device as defined in claim 6, wherein processing to insert a bit of the second signal level on condition that there is a given number of bits of the first signal level consecutively is bit stuffing processing in accordance with the universal serial bus (USB) standard.

13. Electronic equipment comprising:

the data transfer control device as defined in claim 1;

a device which performs given processing on data received from another device through the data transfer control device and the serial bus; and a device for outputting or storing data that has been subjected to the processing.

14. Electronic equipment comprising:

the data transfer control device as defined in claim 6;

a device which performs given processing on data received from another device through the data transfer control device and the serial bus; and a device for outputting or storing data that has been subjected to the processing.

15. Electronic equipment comprising:

the data transfer control device as defined in claim 1;

a device which performs given processing on data that is to be transferred to another device through the data transfer control device and the serial bus; and a device for fetching data to be subjected to the processing.

16. Electronic equipment comprising:

the data transfer control device as defined in claim 6;

a device which performs given processing on data that is to be transferred to another device through the data transfer control device and the serial bus; and a device for fetching data to be subjected to the processing.

* * * * *